(12) United States Patent
Knaplund

(10) Patent No.: US 12,379,532 B2
(45) Date of Patent: Aug. 5, 2025

(54) LIGHTWEIGHT RIGID MIRROR AND A METHOD OF PRODUCING A LIGHTWEIGHT RIGID MIRROR

(71) Applicant: FlightSafety International Inc., Melville, NY (US)

(72) Inventor: Justin King Knaplund, The Hills, TX (US)

(73) Assignee: FLIGHTSAFETY INTERNATIONAL INC., Melville, NY (US)

( * ) Notice: Subject to any disclaimer, the term of this patent is extended or adjusted under 35 U.S.C. 154(b) by 567 days.

(21) Appl. No.: 17/722,670

(22) Filed: Apr. 18, 2022

(65) Prior Publication Data
US 2022/0357490 A1    Nov. 10, 2022

Related U.S. Application Data

(60) Provisional application No. 63/185,497, filed on May 7, 2021.

(51) Int. Cl.
    *G02B 5/10*      (2006.01)
    *G02B 27/30*     (2006.01)

(52) U.S. Cl.
    CPC ............ *G02B 5/10* (2013.01); *G02B 27/30* (2013.01)

(58) Field of Classification Search
    CPC ...... G03B 21/003; G03B 21/10; G03B 21/56; G03B 21/145; G03B 21/2066; G02B 5/00; G02B 5/08; G02B 5/10; G02B 5/0816
    See application file for complete search history.

(56) References Cited

U.S. PATENT DOCUMENTS 3,549,803 A    12/1970  Becht et al.
5,833,340 A *  11/1998  Yoshikawa ............ G03B 21/00
                                                    359/853

(Continued)

FOREIGN PATENT DOCUMENTS

CN    201078759    6/2008
CN    105044809    11/2015

(Continued)

OTHER PUBLICATIONS

Official Action for Canada Patent Application No. 3157757, dated Jun. 12, 2023, 4 pages.

(Continued)

*Primary Examiner* — Sultan Chowdhury
(74) *Attorney, Agent, or Firm* — Sheridan Ross P.C.

(57) ABSTRACT

A mirror body, a mirror array, and a method of producing a mirror and a mirror array are provided. The mirror body can be formed of a rigid foam and has a front surface with a shape adapted to reflect light that originates in a projector of a simulator. A block of the rigid foam may be machined to form the mirror body. A reflective material is positioned over the front surface to reflect light from the projector. In embodiments, the reflective material is a sheet of a metalized film. In embodiments, the reflective material is applied to the front surface in a first state and subsequently changes to a second state. The mirror array may be formed of two or more mirror bodies. In embodiments, a seam between adjacent mirror bodies is covered with the reflective material.

20 Claims, 8 Drawing Sheets

(56) References Cited

U.S. PATENT DOCUMENTS

| | | | |
|---|---|---|---|
| 6,176,588 B1 | 1/2001 | Davis, Jr. et al. | |
| 6,206,531 B1 | 3/2001 | Williams et al. | |
| 7,708,561 B2 | 5/2010 | Ponder et al. | |
| 8,403,502 B2* | 3/2013 | Oren | G09B 9/32 |
| | | | 353/77 |
| 9,470,967 B1* | 10/2016 | Vorst | G09B 9/14 |
| 9,916,768 B2* | 3/2018 | Bell | H04N 9/3164 |
| 10,422,933 B2 | 9/2019 | Mooney et al. | |
| 2004/0121193 A1 | 6/2004 | DeSmitt et al. | |
| 2006/0012895 A1 | 1/2006 | DeSmitt et al. | |
| 2008/0043352 A1 | 2/2008 | Liu | |
| 2010/0279255 A1* | 11/2010 | Williams, II | G09B 9/14 |
| | | | 434/29 |
| 2013/0120362 A1* | 5/2013 | Harris | H04N 13/366 |
| | | | 359/464 |
| 2014/0125959 A1 | 5/2014 | Olive et al. | |
| 2015/0286039 A1 | 10/2015 | Greschik et al. | |
| 2015/0378128 A1 | 12/2015 | Falzon et al. | |
| 2017/0271568 A1* | 9/2017 | Chen | H01L 27/15 |
| 2022/0011480 A1 | 1/2022 | Davis | |

FOREIGN PATENT DOCUMENTS

| | | |
|---|---|---|
| CN | 106707478 | 5/2017 |
| CN | 108369034 | 8/2018 |
| EP | 0857310 | 8/1998 |
| EP | 2705392 | 3/2014 |
| JP | S56-066938 | 6/1981 |
| JP | S56-501386 | 9/1981 |
| WO | WO 2012/150470 | 11/2012 |

OTHER PUBLICATIONS

"FlightSafety Describes 'Largest FOV Collimated Display Ever Built'," Display Daily, Dec. 29, 2014, retrieved from https://www.displaydaily.com/paid-news/ldm/ldm-event-reports/flightsafety-describes-largest-fov-collimated-display-ever-built, 3 pages.

Knaplund, "Large Field of View (FOV) Collimated Displays in Transportable or Relocatable Shelters," Presentation at SIM University, 2014, retrieved from https://docplayer.net/45024873-large-field-of-view-fov-collimated-displays-in-transportable-or-relocatable-shelters.html, 24 pages.

Extended European Search Report for Europe Patent Application No. 22171991.7, dated Sep. 30, 2022, 8 pages.

Official Action (with English summary) for Japan Patent Application No. 2022-076753, dated Jul. 2, 2024, 13 pages.

Official Action (with English summary) for Japan Patent Application No. 2022-076753, dated Sep. 5, 2023, 11 pages.

Official Action for Canada Patent Application No. 3157757, dated Apr. 19, 2024, 3 pages.

Intent to Grant Europe Patent Application No. 22171991.7, dated Mar. 13, 2024, 5 pages.

Official Action (with English translation) for China Patent Application No. 2022/10491973.4, dated Apr. 1, 2025 17 pages.

Official Action (with English translation) for Japan Patent Application No. 2022-076753, dated Mar. 25, 2025, 12 pages.

* cited by examiner

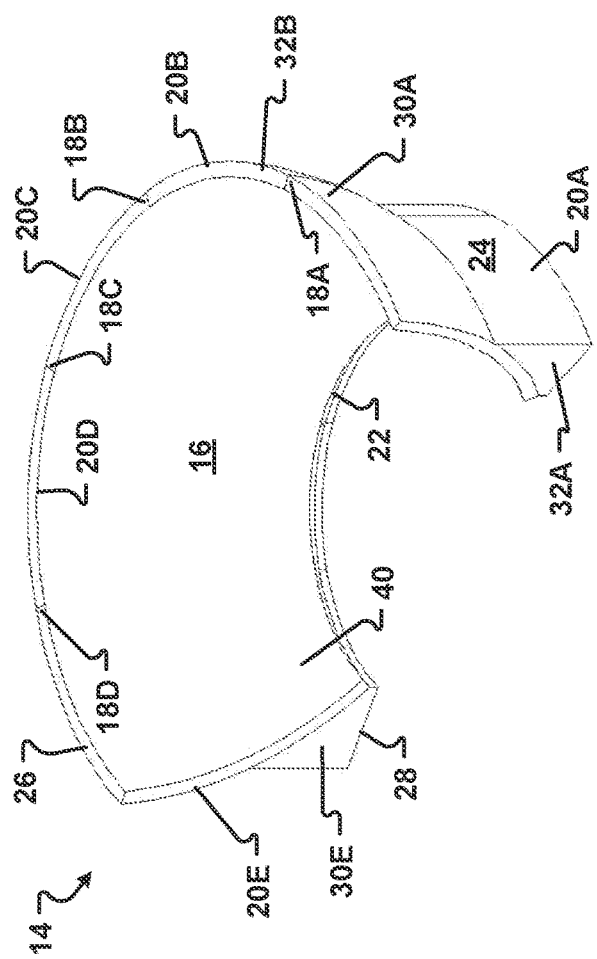
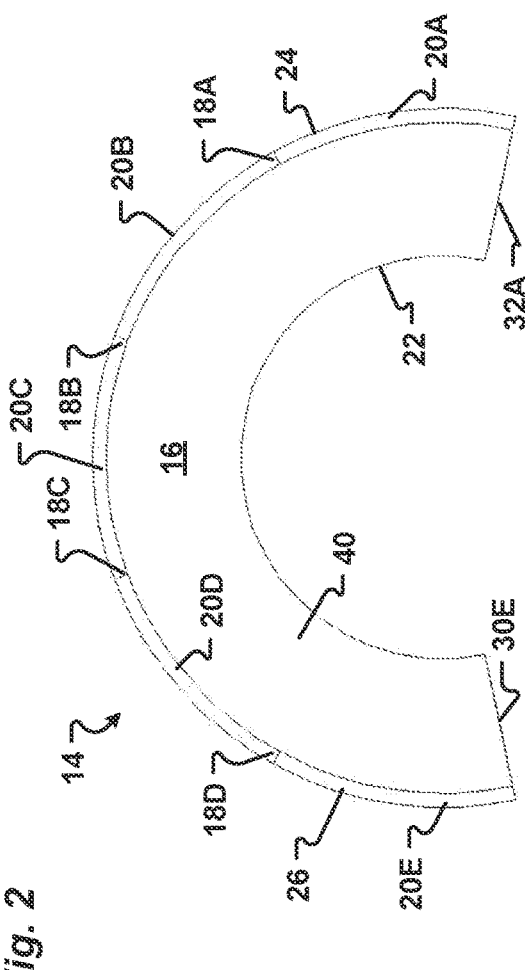
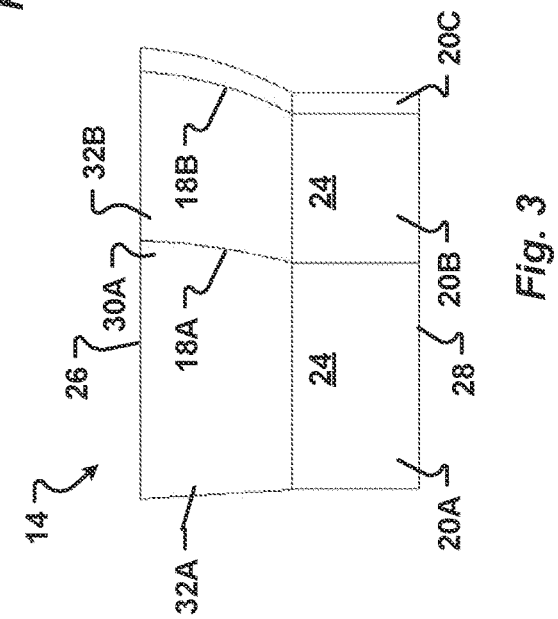

LIGHTWEIGHT RIGID MIRROR AND A METHOD OF PRODUCING A LIGHTWEIGHT RIGID MIRROR

CROSS-REFERENCE TO RELATED APPLICATIONS

This application claims priority under 35 U.S.C. § 119(e) to U.S. Provisional Patent Application Ser. No. 63/185,497 filed May 7, 2021, which is incorporated herein in its entirety by reference.

FIELD

The present disclosure is generally related to a mirror and a mirror array for use in a simulator and methods of producing a mirror.

BACKGROUND

An advanced simulator (such as a flight simulator) used to train a user to operate a vehicle typically displays an image to the user depicting an environment surrounding the vehicle. The realism of the image is achieved by collimating the light (and thus, the image) to the user, which renders the image at infinity focus. Mirrors are used to collimate the light from a screen. The mirrors may be quite large depending on the field of view and other requirements of the simulator. One type of known mirror is a rigid mirror that is formed of glass. Another known mirror is a vacuum-formed (or "stretched film") mirror. There are several problems with these types of mirrors.

Rigid glass mirrors are relatively heavy and difficult to transport. The simulator must be designed to support the weight of the glass mirror and its supporting frame. For a full motion simulator, the motion platform must be strong and stiff enough to support the mirror and the frame which increases the expense of the simulator.

Simulators utilizing rigid mirrors frequently include an array of three to seven or more glass mirrors to achieve the necessary field of view. Gaps or seams are present between the glass mirrors to allow for mirror expansion or movement. Although the gaps may only be about six-hundredths of an inch wide (1.524 mm), the gaps do not reflect the light of the image and appear as dark lines to the user. Such lines may be distracting to the user and decrease the realism and effectiveness of the training simulator.

Another problem is that producing glass mirrors is time consuming and costly. The front reflective surface of glass mirrors is difficult to produce and to maintain. The front surface must be ground, polished, and dimensioned to a predetermined shape. The glass mirror is then positioned in a vacuum chamber while a reflective coating is applied to the front surface. The reflective coating is fragile and easily damaged but difficult to repair.

Yet another limitation of glass mirrors is that they are most economically formed into spherical shapes by the random action of two elements working against each other using an abrasive medium. Vacuum-formed film mirrors also approximate a spherical shape when formed. However, for some applications, the ideal shape for a mirror to collimate light is a parabola, but glass mirrors with a parabolic shape require expensive processes to create. It is also difficult to form a vacuum-formed film mirror with a parabolic shape. Accordingly, a spherical shape is typically used for glass and vacuum-formed mirrors to approximate the central portion of a large parabola, and the resulting optical properties are a compromise between the ideal mirror shape and the economics of large scale manufacturing.

A vacuum-formed mirror is formed by positioning a reflective material, such Mylar®, on a frame with a hollow interior. The edges of the frame are fashioned to create the correct initial geometry for the mirror. The reflective material is attached to the edges of the frame in such a way that it forms an airtight seal. A vacuum is then applied to the hollow interior to pull the reflective material into an approximate spherical shape using a sensor inside the chamber to achieve the proper depth of draw. Unfortunately, the vacuum must be applied continuously. If a constant vacuum is not maintained, the reflective surface will not have the required optical qualities. The pumps required to produce the constant vacuum consume electricity and produce a significant amount of noise which is distracting.

The vacuum-formed mirror is also easily damaged. For example, the reflective material is easily punctured and torn. When the reflective material is punctured, the vacuum will tear the reflective material such that the vacuum cannot be maintained. The reflective surface then loses its shape and optical qualities and must be replaced. Replacing the reflective material is difficult and frequently requires disassembly of portions of the simulator and the frame.

Vacuum-formed mirrors also are less accurate than glass mirrors and poorly match the desired spherical shape of an ideal mirror for several reasons. As the reflective material is pulled inwardly into the hollow interior of the frame, the reflective material has a steeper curve near the pinned edges and a flatter curve near the center resulting in a "catenary" shape. The overall uniformity of the curve is highly dependent on the skill of the workers in pinning the edges of the reflective material to the frame by hand using the correct amount of tension. The results are often slightly non-uniform and astigmatic, giving rise to image distortion or "swimming" as objects are viewed moving across the mirror.

Accordingly, there is need for a new mirror body and a mirror array as well as a new method of forming a mirror body and a mirror array for a simulator.

SUMMARY

One aspect of the present disclosure is a mirror body formed of a lightweight substrate. The lightweight substrate has a density that is much less than glass typically used to form mirrors. In one embodiment, the lightweight substrate has a density of about 12 lbs/ft$^3$ (192 kg/m$^3$). In another embodiment, the density of the lightweight substrate is less than about 60 lbs/ft$^3$ (961 kg/m$^3$). In contrast, float glass typically used to form glass mirrors has a density of about 160 lbs/ft$^3$ (2563 kg/m$^3$).

In one embodiment, the lightweight substrate is a foam. Additionally, or alternatively, the lightweight substrate may include one or more of a plastic, a fiberglass, a metal, a rubber, and a wood.

A support element is optionally provided to stiffen and/or support the mirror body. In one embodiment, the support element comprises a longitudinal member such as a rod, a tube, a wire, a cable, or an angle iron. The support element can be formed of any suitable material including a wood, a plastic, a glass and a metal. The support element may be positioned on one or more exterior surface of the mirror body. Additionally, or alternatively, the support element may be positioned at least partially, or completely, within the mirror body.

The mirror body has a front surface with a shape adapted to reflect light from a light source such as a projector, an LED panel, or an OLED screen. In one embodiment, the shape is adapted to collimate light scattered from a diffusion screen that is illuminated by the light source. Alternatively, the light source directly illuminates the front surface of the mirror body.

The front surface of the mirror body is covered with a reflective material.

In one embodiment, the reflective material is a sheet. The sheet may be a metalized film.

Alternatively, in another embodiment, the reflective material is applied to the front surface in a liquid state and subsequently changes to a solid state. In one embodiment, the reflective material is a paint with reflective properties.

Optionally, the reflective material is applied to the front surface of the mirror body by a physical vapor deposition method. In this embodiment, the reflective material may comprise a metal, such as an aluminum.

Another aspect of the present disclosure is a mirror array for a simulator. The mirror array includes two or more mirror bodies formed of a lightweight substrate. The lightweight substrate may be a foam.

Front surfaces of the mirror bodies are covered by a reflective material. In at least one embodiment, a seam between two adjacent mirror bodies is covered by the reflective material.

The reflective material may be a sheet. The sheet may be a metalized film.

In another embodiment, the reflective material comprises a metal applied to the front surfaces of the mirror bodies by a physical vapor deposition method.

Alternatively, the reflective material is a paint. The paint is applied to the front surfaces in a first state. Thereafter, the paint changes to a second state that is dimensionally stable. In the second state, the paint includes suitable reflective qualities. In some embodiments, the paint is cured after being applied to the front surfaces.

Still another aspect of the present disclosure is a method of forming a mirror body for a mirror array. The method includes forming a substrate into a mirror body. In at least one embodiment, the substrate is a foam.

The mirror body may be formed by casting the substrate in a mold or with the use of a form. In other embodiments, the substrate is used in an additive manufacturing process to form the mirror body.

In some embodiments, the mirror body is formed by mechanically removing material from a block of the substrate. Optionally, a CNC machine is used to remove material from the block to form the mirror body. The mirror body may also be formed by a combination of two or more of these methods.

The mirror body optionally is formed from two or more substrates. In at least one embodiment, the mirror body is formed of a first material and a second material that has different material properties than the first material.

In some embodiments, the first material is a first foam. The first foam has a first density.

The second material may be a second foam which has a second density that is higher than the first density. In other embodiments, the second material is a glass.

In some embodiments, a first portion of the mirror body is formed of the first foam by any suitable method, including casting, additive manufacturing, removing portions of a block formed of the first foam, or any other method. A surface of the mirror body first portion, such as the front surface, can be reshaped by removing some of the first foam by any suitable method, including sanding, milling, cutting, heating, and the like.

Thereafter, the second material is used to form a second portion of the mirror body, such as the front surface of the mirror body. In one embodiment, the second portion is formed of the second foam. Optionally, the second foam is cast over the front surface of the first portion of the mirror body.

Alternatively, the second portion is an insert formed of the second material and which includes the front surface with a predetermined shape. The insert is then joined to the first portion by any method known to those of skill in the art to form the mirror body. In some embodiments, the second portion is adhered or glued to the first portion. Additionally, or alternatively, a mechanical fastener can be used to interconnect the second portion to the first portion.

In at least one embodiment, the second portion is formed of the second foam. Alternatively, the second portion is formed of the glass. In some embodiments, the second portion includes a reflective material applied to the front surface by a physical vapor deposition method.

Although only two materials are described in this example, any number of materials may be combined to form a mirror body of the present disclosure.

The method includes positioning a reflective material on a front surface of the mirror body. The reflective material may be applied to the front surface in a liquid state. Alternatively, the reflective material is a sheet.

One aspect of the present disclosure is mirror as substantially described herein.

Another aspect is a mirror array for a simulator that includes at least one mirror as substantially described herein.

Another aspect of the present disclosure is a method of forming a mirror body as substantially described herein.

Still another aspect is a method of forming a mirror array including at least one mirror as substantially described herein.

One aspect of the present disclosure is a mirror for a simulator, comprising: (1) a body formed of a rigid foam and including a front surface, a rear surface, a top surface, a bottom surface, a first side, and a second side, the front surface having a shape adapted to reflect light that originates in a projector of the simulator; and (2) a reflective material covering the front surface to reflect the light from the projector.

The front surface of the mirror body is configured to reflect the light to a user of the simulator.

In embodiments, the reflective material conforms to the shape of the front surface.

In some embodiments, the reflective material is affixed to the body with a chemical fastener such as an adhesive.

In additionally, or alternatively, the reflective material may be affixed to the body with a mechanical fastener such as a clip, a staple, a nail, and screw.

In at least one embodiment, the reflective material is retained in a predetermined position with respect to the front surface by static electricity.

In one or more embodiment, the reflective material is retained in a predetermined position with respect to the front surface by suction.

In at least one embodiment, one or more of the rear surface, the top surface, the bottom surface, the first side, and the second side is coated with a material to maintain the suction and prevent airflow through the coated surface.

In some embodiments, the body is formed by one or more of: (i) machining a block of the rigid foam; (ii) casting a material that is cured to form the rigid foam; (iii) use of an additive manufacturing process; and (iv) an injection molding process.

Additionally, or alternatively, the mirror includes one or more of the previous embodiments and optionally: (a) the rigid foam defines a first portion of the body; and (b) a second portion of the body is defined by an insert formed of a second material, the insert defining the front surface of the body.

In some embodiments, the mirror includes one or more of the previous embodiments and the rigid foam comprises one or more of: (a) a polyurethane foam; (b) a polyethylene foam; (c) a polystyrene foam; (d) a polyisocyanurate foam; (e) a thermosetting polymer (or plastic); (f) a metal foam; (g) a syntactic foam; (h) a cellulose foam; and (i) a high density urethane foam.

In at least one embodiment, the mirror includes one or more of the previous embodiments and the reflective material is one or more of: (a) a metalized film; (b) biaxially-oriented polyethylene terephthalate (BoPET); (c) a polyester film made from stretched polyethylene terephthalate (PET); (d) a metallized PET (polyester) film; (e) a vacuum metallized high gloss PET film; (f) an aluminized polyester film; (f) a polymer film coated with a metal; (g) a material applied to the front surface by a physical vapor deposition method, and (h) a material applied to the front surface in a first state that subsequently changes to a solid state.

In some embodiments, the mirror includes one or more of the previous embodiments and the shape of the front surface is adapted to collimate light scattered from a diffusion screen that is illuminated by the projector.

In one or more embodiments, the mirror includes one or more of the previous embodiments and the shape of the front surface of the mirror body includes at least a section of a circle, a sphere, a parabolic, an ellipsoid, a plane, a freeform, and combinations thereof.

In some embodiments, the mirror includes one or more of the previous embodiments and the body is formed of a rigid foam that is at least partially porous.

Additionally, or alternatively, in one or more embodiments, at least a portion of the body is adapted to facilitate drawing air through the front surface. In some embodiments, a least the front surface has a plurality of apertures formed to facilitate airflow.

The mirror optionally includes one or more of the previous embodiments and the reflective material is applied to the front surface in a first state and subsequently changes to a solid state.

In some embodiments, the reflective material comprises a paint with reflective qualities.

Alternatively, in at least one embodiment, the reflective material is applied to the front surface by a physical vapor deposition method during which the reflective material is in a vapor phase. Accordingly, the first state of the reflective material may be described as a vapor or gaseous state or phase.

Another aspect is a mirror for a simulator, comprising: (1) a body formed of a rigid foam and including a front surface, a rear surface, a top surface, a bottom surface, a first side, and a second side, the front surface having a shape adapted to reflect light that originates in a projector of the simulator; and (2) a reflective material covering the front surface to reflect the light from the projector, the reflective material being applied to the front surface in a first state and subsequently changing to a solid state.

In some embodiments, the reflective material comprises a paint with reflective qualities.

In other embodiments, the paint includes pigments that reflect light.

In one or more embodiments, the reflective material is applied to the front surface by a physical vapor deposition method during which the first state of the reflective material is in a vapor or gaseous phase or state.

In at least one embodiment, the mirror includes one or more of the previous embodiments and optionally the body is formed by one or more of: (i) machining a block of the rigid foam; (ii) casting a material that is cured to form the rigid foam; (iii) use of an additive manufacturing process; and (iv) an injection molding process.

Additionally, or alternatively, the mirror includes one or more of the previous embodiments and optionally: (a) the rigid foam defines a first portion of the body; and (b) a second portion of the body is defined by an insert formed of a second material, the insert defining the front surface of the body.

In embodiments, the mirror includes one or more of the previous embodiments and the rigid foam optionally comprises one or more of: (a) a polyurethane foam; (b) a polyethylene foam; (c) a polystyrene foam; (d) a polyisocyanurate foam; (e) a thermosetting polymer (or plastic); (f) a metal foam; (g) a syntactic foam; (h) a cellulose foam; and (i) a high density urethane foam.

In some embodiments, the mirror includes one or more of the previous embodiments and optionally the shape of the front surface of the mirror body is adapted to collimate light scattered from a diffusion screen that is illuminated by the projector.

In other embodiments, the mirror includes one or more of the previous embodiments and the shape of the front surface of the mirror body optionally includes at least a section of a circle, a sphere, a parabolic, an ellipsoid, a plane, a freeform, and combinations thereof.

Another aspect of the present disclosure is a mirror array for a simulator, comprising: (1) a first mirror body positioned adjacent to a second mirror body, the mirror bodies formed of a foam; and (2) a reflective material covering front surfaces of the mirror bodies such that the reflective material covers a seam between the first and second mirror bodies.

In some embodiments, the foam is one or more of: (a) a polyurethane foam; (b) a polyethylene foam; (c) a polystyrene foam; (d) a polyisocyanurate foam; (e) a thermosetting polymer (or plastic); (f) a metal foam; (g) a syntactic foam; (h) a cellulose foam; and (i) a high density urethane foam.

In at least one embodiment, the reflective material is a sheet of one or more of: (a) a metalized film; (b) biaxially-oriented polyethylene terephthalate (BoPET); (c) a polyester film made from stretched polyethylene terephthalate (PET); (d) a metallized PET (polyester) film; (e) a vacuum metallized high gloss PET film; (f) an aluminized polyester film; and (g) a polymer film coated with a metal.

In some embodiments, the mirror array includes one or more of the previous embodiments and optionally the reflective material is applied to the front surfaces in a first state and subsequently changes to a solid state.

In other embodiments, the mirror array includes one or more of the previous embodiments and the reflective material optionally comprises a paint with pigments that reflect light.

In at least one embodiment, one or more of the first and second mirror bodies includes: (a) a first portion formed of the rigid foam; and (b) a second portion defined by an insert formed of a second material, the insert defining the front surface of the mirror body.

In some embodiments, the reflective material conforms to a shape of the front surfaces.

In one or more embodiments, the reflective material is affixed to at least one of the first and second mirror bodies with a chemical fastener such as an adhesive.

In at least some embodiments, the reflective material is affixed to at least one of the first and second mirror bodies with a mechanical fastener such as a clip, a staple, a nail, and screw.

Additionally, or alternatively, the mirror array may comprise one or more of the previous embodiments and optionally the reflective material is retained in a predetermined position with respect to the front surfaces by static electricity.

In some embodiments, the reflective material is retained in a predetermined position with respect to the front surfaces by suction.

In at least one embodiment, one or more of the rear surfaces, the top surfaces, the bottom surfaces, the first sides, and the second sides are coated with a material to maintain the suction and prevent airflow through the coated surfaces.

In some embodiments, the mirror array includes one or more of the previous embodiments and the front surfaces may optionally have shapes adapted to collimate light scattered from a diffusion screen that is illuminated by a projector of the simulator.

In at least one embodiment, the mirror array includes one or more of the previous embodiments and the front surfaces of the first and second mirror bodies have shapes that include at least a section of a circle, a sphere, a parabolic, an ellipsoid, a plane, a freeform, and combinations thereof.

In at least some embodiments, the mirror array includes one or more of the previous embodiments and one or more of the first and second mirror bodies is formed of a rigid foam. Optionally, the rigid foam is at least partially porous.

Additionally, or alternatively, in one or more embodiments, at least a portion of one or more of the mirror bodies of the mirror array is adapted to facilitate drawing air through the front surface. In some embodiments, a least the front surface has a plurality of apertures formed to facilitate airflow.

Another aspect is a method of forming a mirror body for a simulator, comprising: (1) shaping a substrate into a mirror body which includes a front surface with a geometry adapted to reflect light that originates in a projector of the simulator; and (2) covering the front surface with a reflective material to reflect the light from the projector.

In one or more embodiments, the mirror body is rigid.

In some embodiments, the substrate comprises one or more of: (a) a polyurethane foam; (b) a polyethylene foam; (c) a polystyrene foam; (d) a polyisocyanurate foam; (e) a thermosetting polymer (or plastic); (f) a metal foam; (g) a syntactic foam; (h) a cellulose foam; (i) a high density urethane foam; (j) a glass; (k) a plastic; (l) a fiberglass; (m) a metal; (n) a rubber; and (o) a wood.

In some embodiments, the substrate comprises a rigid foam. Optionally, the rigid foam is at least partially porous.

In at least one embodiment, shaping the substrate comprises milling a block of the substrate into the mirror body.

In embodiments, shaping the substrate comprises one or more of: (i) machining a block of the rigid foam; (ii) casting a material that is cured to form the rigid foam; (iii) use of an additive manufacturing process; and (iv) use of an injection molding process.

In some embodiments, the method includes one or more of the previous embodiments and further comprises smoothing the geometry of the front surface to a mean surface roughness of from about 0.23 µm to about 0.10 µm.

In some embodiments, the reflective material is a sheet of one or more of: (a) a metalized film; (b) biaxially-oriented polyethylene terephthalate (BoPET); (c) a polyester film made from stretched polyethylene terephthalate (PET); (d) a metallized PET (polyester) film; (e) a vacuum metallized high gloss PET film; (f) an aluminized polyester film; and (g) a polymer film coated with a metal.

In embodiments, covering the front surface with the reflective material comprises cutting the sheet to fit the front surface.

Additionally, or alternative, in one or more embodiments, covering the front surface with the reflective material comprises affixing the reflective material to the mirror body with a chemical fastener.

The method may include one or more of the previous embodiments and optionally, in at least one embodiment, covering the front surface with the reflective material comprises affixing the reflective material to the mirror body with a mechanical fastener.

In some embodiments, the mechanical fastener is one or more of a clip, a staple, a nail, and screw.

In embodiments, the reflective material is retained in a predetermined position with respect to the front surface by static electricity.

The method optionally further comprises applying an electrostatic charge to one or more of the front surface and the reflective material.

Additionally, or alternatively, in at least one embodiment, the reflective material is retained in a predetermined position with respect to the front surface by suction.

In some embodiments, the method further comprises drawing air through the front surface to create suction.

In embodiments, the method includes one or more of the previous embodiments and may further comprise coating one or more of a rear surface, a top surface, a bottom surface, a first side, and a second side of the mirror body with a material to maintain the suction through the front surface and to prevent airflow through the coated surface.

In some embodiments, the method includes one or more of the previous embodiments and further comprises connecting a fitting for a hose to the mirror body.

In at least one embodiment, the method includes one or more of the previous embodiments and further comprises connecting a hose of a vacuum pump to the fitting.

In embodiments, the method includes one or more of the previous embodiments and covering the front surface further comprises applying the reflective material to the front surface in a first state and the reflective material subsequently changes to a solid state.

The method may include any one or more of the previous embodiments, and optionally the first state of the reflective material is a vapor or gaseous phase or state.

In some embodiments, the method includes one or more of the previous embodiments and further comprises curing the reflective material.

In at least one embodiment, the method includes one or more of the previous embodiments and covering the front surface further comprises applying the reflective material onto the front surface in the first state.

In some embodiments, the reflective material is sprayed onto the front surface in the first state.

In one or more embodiments, the reflective material comprises a paint with reflective qualities.

In embodiments, the paint includes pigments that reflect light.

In some embodiments, the method includes one or more of the previous embodiments and covering the front surface further comprises applying the reflective material to the front surface by a physical vapor deposition method during which the reflective material is in a vapor phase.

In at least one embodiment, the method includes one or more of the previous embodiments and shaping the substrate further comprises: (a) forming the substrate into a first portion of the mirror body; (b) forming a second substrate into an insert that defines a second portion of the mirror body, the insert defining the front surface of the mirror body.

In some embodiments, the method includes one or more of the previous embodiments and covering the front surface further comprises positioning the insert in a vacuum chamber and using a physical vapor deposition method to transfer the reflective material to the front surface.

In embodiments, the method includes one or more of the previous embodiments and shaping the substrate further comprises shaping the geometry of the front surface to collimate light scattered from a diffusion screen that is illuminated by the projector of the simulator.

In embodiments, the method includes one or more of the previous embodiments and shaping the substrate further comprises shaping the geometry of the front surface to include at least one of a section of a circle, a sphere, a parabolic, an ellipsoid, a plane, a freeform, and combinations thereof.

In some embodiments, the method includes one or more of the previous embodiments and shaping the substrate further comprises adapting the mirror body to facilitate drawing air through the front surface. In some embodiments, the method further includes forming a plurality of apertures through a least the front surface to facilitate airflow.

The Summary is neither intended nor should it be construed as being representative of the full extent and scope of the present disclosure. The present disclosure is set forth in various levels of detail in the Summary as well as in the attached drawings and the Detailed Description and no limitation as to the scope of the present disclosure is intended by either the inclusion or non-inclusion of elements, components, etc. in this Summary. Additional aspects of the present disclosure will become more clear from the Detailed Description, particularly when taken together with the drawings.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

The term "a" or "an" entity, as used herein, refers to one or more of that entity. As such, the terms "a" (or "an"), "one or more" and "at least one" can be used interchangeably herein.

Unless otherwise indicated, all numbers expressing quantities, dimensions, conditions, ratios, ranges, and so forth used in the specification and claims are to be understood as being modified in all instances by the term "about" or "approximately". Accordingly, unless otherwise indicated, all numbers expressing quantities, dimensions, conditions, ratios, ranges, and so forth used in the specification and claims may be increased or decreased by approximately 5% to achieve satisfactory results. Additionally, where the meaning of the terms "about" or "approximately" as used herein would not otherwise be apparent to one of ordinary skill in the art, the terms "about" and "approximately" should be interpreted as meaning within plus or minus 5% of the stated value.

All ranges described herein may be reduced to any sub-range or portion of the range, or to any value within the range without deviating from the invention. For example, the range "5 to 55" includes, but is not limited to, the sub-ranges "5 to 20" as well as "17 to 54."

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts and the equivalents thereof shall include all those described in the Summary, Brief Description of the Drawings, Detailed Description, Abstract, and Claims themselves.

BRIEF DESCRIPTION OF THE DRAWINGS

The accompanying drawings, which are incorporated in and constitute a part of the specification, illustrate embodiments of the disclosed system and together with the general description of the disclosure given above and the detailed description of the drawings given below, serve to explain the principles of the disclosed system(s) and device(s).

FIG. 2 is a front perspective view of a mirror array of the simulator of FIG. 1;

FIG. 3 is a right side elevation view of the mirror array of FIG. 2;

FIG. 4 is a top plan view of the mirror array of FIG. 2;

Figure 1:
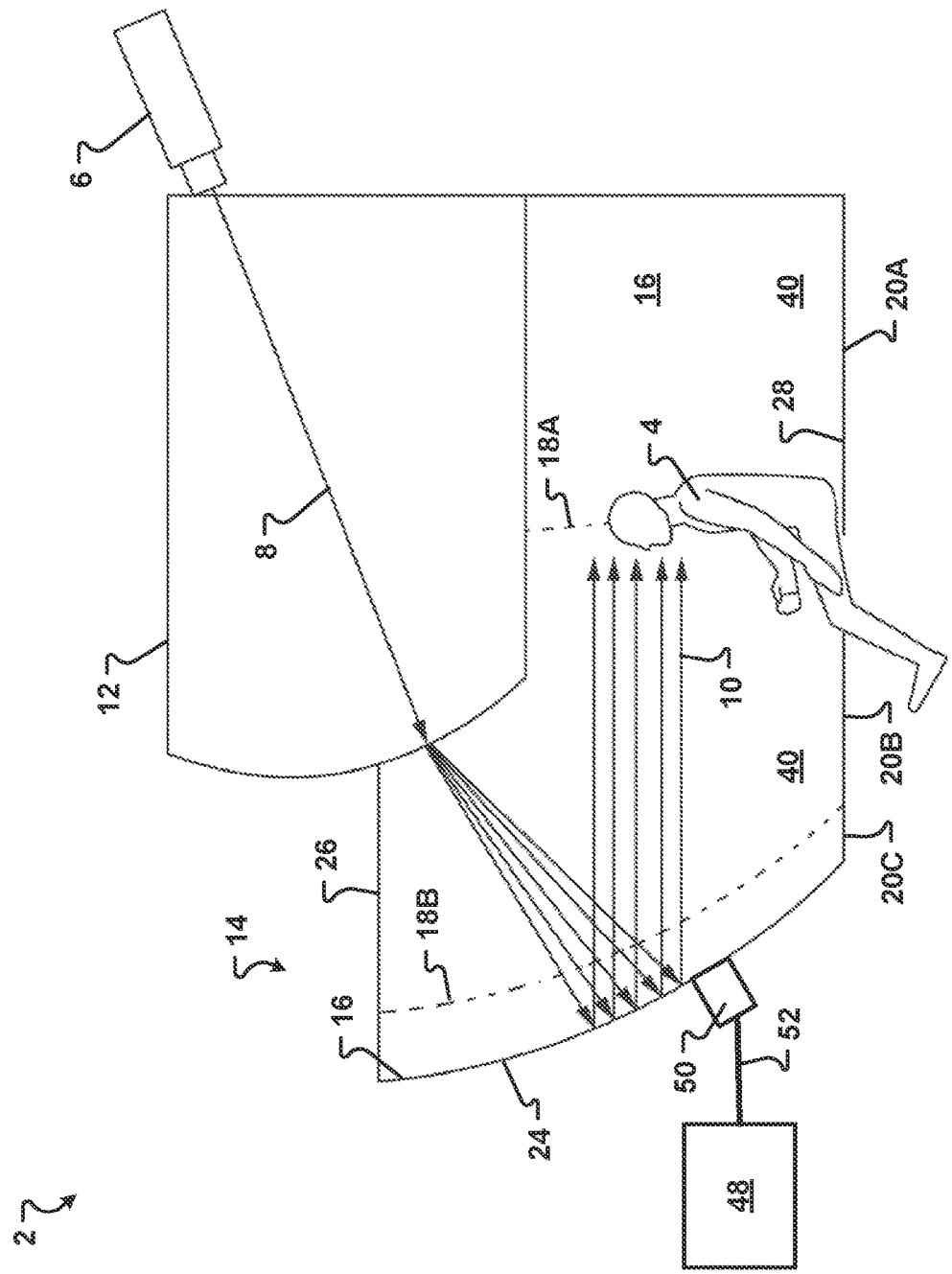
FIG. 1 is a schematic cross-sectional side elevation view of a simulator with a lightweight rigid mirror according to embodiments of the present disclosure.

The drawings are not necessarily (but may be) to scale. In certain instances, details that are not necessary for an understanding of the disclosure or that render other details difficult to perceive may have been omitted. It should be understood, of course, that the disclosure is not necessarily limited to the embodiments illustrated herein. As will be appreciated, other embodiments are possible using, alone or in combination, one or more of the features set forth above or described below. For example, it is contemplated that various features and devices shown and/or described with respect to one embodiment may be combined with or substituted for features or devices of other embodiments regardless of whether or not such a combination or substitution is specifically shown or described herein.

The following is a listing of components according to various embodiments of the present disclosure, and as shown in the drawings:

| Number | Component |
|---|---|
| 2 | Simulator |
| 4 | User |
| 6 | Light source (such as a projector) |
| 8 | Image |
| 10 | Collimated light rays |
| 12 | Screen |
| 14 | Mirror Array |
| 16 | Reflecting surface |
| 18 | Seam |
| 20 | Mirror body |
| 22 | Front surface |
| 24 | Rear surface |
| 26 | Top surface |
| 28 | Bottom surface |
| 30 | First side |
| 32 | Second side |
| 34 | Recess on mirror side |
| 36 | Projection on mirror side |
| 38 | Mount points |
| 40 | Reflective material |
| 42 | Sheet of reflective material |
| 44 | First edge of reflective material |
| 46 | Second edge of reflective material |
| 48 | Pump |
| 50 | Fitting |
| 52 | Conduit |
| 54 | Block |
| 56 | Insert |
| 60 | Method of forming a mirror body |
| 62 | Provide substrate |
| 64 | Form substrate into mirror body |
| 66 | Optionally finishing a surface of the mirror body |
| 68 | Coating a surface of the mirror body |
| 70 | Connecting a fitting to the mirror body |
| 72 | Attaching a hard point to the mirror body |
| 74 | Positioning a reflective material on the front surface |
| 80 | Method of forming a mirror array |
| 82 | Providing the mirror bodies |
| 84 | Positioning the mirror bodies |
| 86 | Filling a seam between mirror bodies |
| 88 | Positioning a reflective material on the mirror bodies |

DETAILED DESCRIPTION

Referring now to FIG. 1, a simulator 2 according to embodiments of the present disclosure is generally illustrated. The simulator 2 generally includes a projector 6, a screen 12, and a mirror array 14 opposite the screen 12. A reflecting surface 16 is formed on the mirror array. The reflecting surface 16 is oriented toward the screen.

During use, the projector 6 projects an image 8 onto the screen 12. The image 8 is viewed by a user 4 as a reflection in the mirror array 14. In embodiments of the present disclosure the mirror array 14 is configured such that the image 8 is visible to the user 4 as collimated light rays 10 and seen at a distant focus without distortion to the image. The collimated light rays 10 are substantially parallel to each other. This is achieved by projecting the image 8 onto the screen 12 by the projector 6, with the image 8 then being reflected in the mirror array 14 and viewed by the user 4.

As will be appreciated by one of skill in the art, in the example of FIG. 1, the image 8 is back-projected onto a concave side of the screen 12 by the projector 6. The projector 6 is positioned facing the concave side of the screen. In such embodiments, the image 8 is also visible on an opposite convex side of the screen 12 and is then reflected onto the mirror array 14. In this embodiment, the convex side of the screen 12 has a diffusion coating or is treated to diffuse light from the projector 6. However, it will be understood by one skilled in the art that any arrangement of the projector 6, the screen 12, and the mirror array 14 are within the scope of the present disclosure. Further, in some embodiments, the mirror array 14 is configured to reflect light directly from the projector 6 without first passing through the screen 12.

When used with a flight simulator 2, the image 8 visible to the user 4 may depict an environment outside of a cockpit of an airplane or helicopter. The flight simulator 2 may comprise a control system with a processor and a memory which stores flight simulation software that generates the image 8.

Although the mirror array 14 of the present disclosure is described with respect to a flight simulator 2, it will be appreciated that the mirror array can be used with any type of simulator including, for example, simulators for mobile equipment and vehicles of all sizes and types such as cars, trucks, trains, tracked vehicles (such as tanks or construction vehicles), ships, and spacecraft. The mirror array may also be used with games or other simulation systems as well as in theaters.

The mirror array 14 may have any size and geometric configuration required to meet one or more of collimation, geometric distortion, field of view, and other requirements of the simulator 2. In embodiments, the mirror array 14 has one mirror body 20. However, in some embodiments, the mirror array includes at least two mirror bodies 20 with a gap or seam 18 between adjacent mirror bodies. Seams 18 are illustrated in dashed lines in FIG. 1 for illustrative purposes only. In the mirror array 14 of some embodiments of the present disclosure, the seams 18 are not visible to the user 4 as they are covered by a reflective material 40 as described herein.

Any number of mirror bodies 20 may be in the mirror array. The mirror array 14 illustrated in FIG. 1 includes five mirror bodies, although only three mirror bodies 20A, 20B, and 20C are shown with two seams 18A, 18B illustrated in dashed lines. In other embodiments, a simulator 2 of the present disclosure may have a mirror array 14 including one mirror body with no seams, two mirror bodies and one seam, three mirror bodies and two seams, four mirror bodies and three seams, or six mirror bodies and five seams.

Referring now to FIGS. 2-8, each mirror body 20 of the mirror array 14 is formed of a light-weight substrate. The mirror body 20 generally includes a front surface 22 opposite a rear surface 24, a top surface 26 opposite a bottom surface 28, and a first side 30 opposite a second side 32. The front surface 22 is shaped to reflect light from a light source 6. More specifically, the front surface 22 has a shape to reflect the image 8 produced by a light source 6 from the screen 12 to the user 4.

Figure 6:
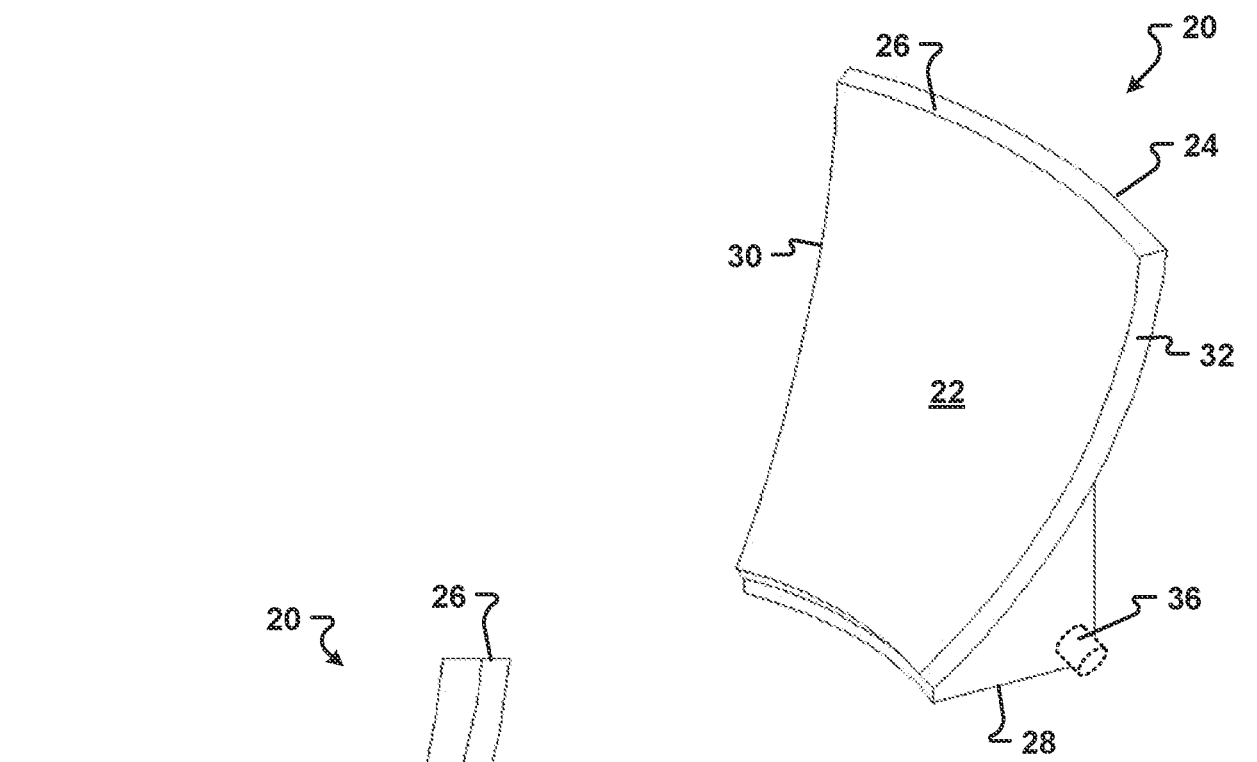
FIG. 6 is a perspective view of a mirror body of the mirror array of FIG. 2 according to embodiments of the present disclosure.
Figure 7:
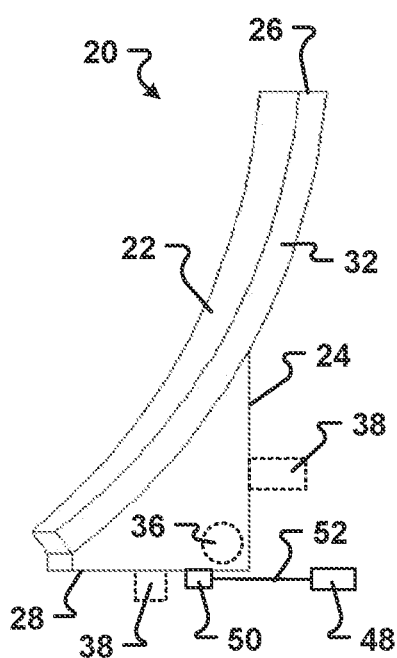
FIG. 7 is a right side elevation view of the mirror body of FIG. 6.
Figure 8:
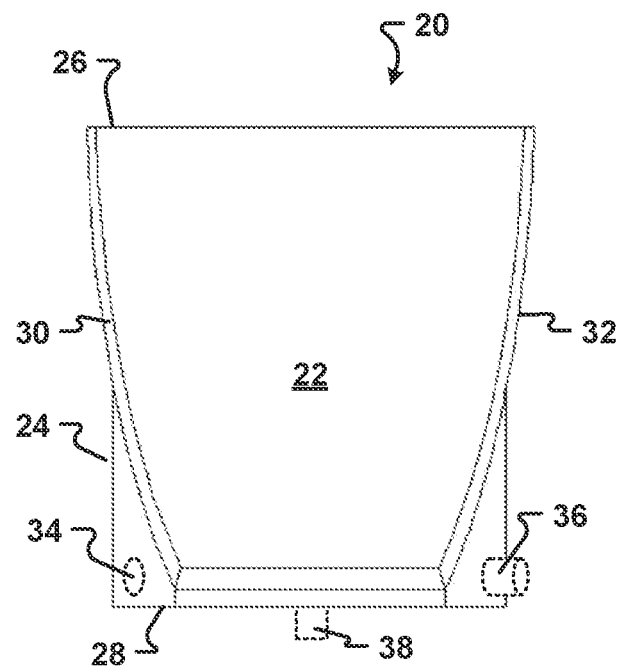
FIG. 8 is a front elevation view of the mirror body of FIG. 6.

The mirror body 20 may optionally include mounting or hard points 38 for securing the mirror body to a frame of the simulator 2 and/or to adjacent mirror bodies. The hard points 38 are schematically illustrated in FIGS. 6-8, although other positions and arrangements of the hard points are contemplated. A hard point 38 may extend outwardly from the mirror body. Some hard points may be at least partially recessed into the mirror body.

In embodiments, the front surface 22 may have any predetermined shape adapted to collimate light from the projector 6 to the user 4. Each mirror body 20 of the mirror array 14 may be curved or flat. The mirror array 14 may include a combination of mirror bodies 20 with front surfaces that are curved and/or flat.

In embodiments, the front surface 22 is curved. For example, the front surface 22 may be generally concave as illustrated FIGS. 6-8. In another embodiment, the front surface 22 is convex. The front surface may have any desired shape selected to reflect light from a light source 6, including spherical, elliptical, freeform, flat, and other geometries known to those of skill in the art. In embodiments, the front surface 22 of the mirror body 20 has a shape that includes at least a section of a circle, a sphere, a parabolic, an ellipsoid, a plane, a freeform, and combinations thereof.

A front surface 22 of a mirror body that is convex or concave may have any predetermined radius of curvature. In embodiments, a front surface 22 has a radius of curvature of between about 9 feet and about 12 feet. Optionally, the radius of curvature is about 9.25 feet, about 10 feet, or about 11 feet. In other embodiments, the radius of curvature may be less than 9 feet or greater than 12 feet.

As generally illustrated in FIGS. 6-8, in embodiments, the first and second sides 30, 32 of a mirror body 20 are oriented generally vertically. In embodiments, the first side 30 is a mirror-image of (or congruent to) the second side 32. In addition, the sides 30, 32 are optionally planar. The sides 30, 32 may also be described as having a radial shape that is aligned with a center of curvature of the mirror array 14 so that the sides of adjacent mirror bodies 20 match each other.

The radial sides 30, 32 may be approximately perpendicular, or "plumb" in relation to the front surface 22. Alternatively, the radial sides 30, 32 may be orientated at oblique angles to the front surface 22, with the first side 30 oriented at a complimentary angle to the second side 32.

In another embodiment, the first and second sides 30, 32 may have different shapes. For example, a first side 30 of a first mirror body may be shaped to ensure a predetermined alignment with a second side 32 of a second mirror body. Optionally, the adjacent sides 30, 32 of the first and second mirror bodies may overlap in a manner similar to a "lap joint". Additionally, or alternatively, the adjacent sides 30, 32 of the mirror bodies may be shaped to form a tongue and groove joint, a mortise and tenon joint, a dovetail joint, or other joints known to those of skill in the art.

In embodiments, dowels, pins, or other mechanical fasteners may be used to join the first side 30 of the first mirror body to the second side 32 of the second mirror body. For example, a pocket may be formed in each mirror body proximate to the first and second sides. A mechanical fastener may then extend from a first pocket in the first mirror body to a second pocket in the second mirror body.

Additionally, or alternatively, a projection (such as a flange or a bracket) may extend from the rear surface 24 of each mirror body proximate to the first side 30 and/or the second side 32. A mechanical fastener may then extend through a first projection of the first mirror body and through a second projection of the second mirror body.

In embodiments, the first side 30 is adapted to lock with the second side. Specifically, in embodiments the first side has a shape or includes a feature configured to frictionally engage a feature of the second side.

Optionally, the first side 30 may include a first bevel oriented at a first angle relative to the front surface 22. The second side 32 of the second mirror may have an opposite second bevel oriented at a second angle relative to the front surface. The first and second angles may be complementary angles.

Additionally, or alternatively, in embodiments, the first and second sides of adjacent mirror bodies 20 may be keyed to each other. For example, and referring now to FIG. 8, one of the first and second sides of a first mirror body 20 can include a recess 34 to receive a projection 36 of the other one of the first and second sides of the second mirror body. The recess 34 and projection 36 may have any shape, size, and orientation. In embodiments, the recess is generally cylindrical and the projection has a corresponding cylindrical shape. Additionally, or alternatively, the recess may be a groove and the projection is a corresponding tongue.

In another embodiment, the first side optionally includes a pin and the second side optionally includes a corresponding projection or "tail" similar to a dovetail joint. Other configurations of the first and second sides of the mirror bodies are contemplated.

As generally illustrated in FIGS. 2-5, in embodiments the mirror array 14 includes a first mirror body 20A with a first side 30A that is positioned adjacent to a second side 32B of a second mirror body 20B. A first seam 18A is present between the first and second mirror bodies.

Although the seams 18 are illustrated as being oriented approximately vertically in FIGS. 2-5, other configurations and orientations of seams 18 are contemplated. For example, in embodiments, the mirror bodies 20 are stacked with a first mirror body at the bottom and a second mirror body positioned on top of the first mirror body. In this embodiment, a first seam 18 may be oriented approximately horizontally.

The first and second mirror bodies 20A, 20B may optionally be joined together in any suitable manner known to those of skill in the art. In embodiments, the first mirror body is joined to the second mirror body by a chemical means, such as an adhesive or a glue. Additionally, or alternatively, a mechanical means, such as a fastener, can be used to interconnect the first and second mirror bodies. In another embodiment, the first mirror body 20A is welded to the second mirror body 20B.

Optionally, the simulator includes a frame (not illustrated). The mirror bodies 20 of the mirror array may be interconnected to the frame such that adjacent mirror bodies are held in a predetermined orientation with respect to each other. Other systems and methods of interconnecting and/or aligning adjacent mirror bodies 20 are contemplated.

The front surface 22 of a mirror body 20 is optionally treated to obtain a desired surface quality or accuracy. For example, the front surface may be mechanically shaped to a predetermined finish. The mechanical shaping may remove at least some material from the front surface.

In at least one embodiment, the front surface is sanded to the predetermined finish. In embodiments, the front surface 22 is sanded with an abrasive material having a predetermined grit selected to achieve a desired mean surface roughness, Ra. In embodiments, the abrasive material is a sandpaper of between 400 grit and 1,000 grit in order to achieve an Ra of between about 0.23 µm to about 0.10 µm.

Additionally, or alternatively, a filling material may be applied to the front surface to alter the shape of the front surface 22. The filling material may be used to fill depressions or scratches in the front surface. In embodiments, the filling material is a non-shrink polyester body filler, such as Bond-O and the like. Any suitable filling material known to those of skill in the art may be applied to the front surface of the mirror array.

The filling material may also be applied to fill in seams 18 between adjacent mirror bodies 20 to make a continuous smooth surface. In embodiments, the filling material is pressed into the seams 18 and built up to be raised above the front surfaces of the adjacent mirror bodies. Thereafter, when the filling material hardens, it can be sanded down to be level with the front surfaces of the mirror bodies such that the filling material in the seams is smooth and contiguous with the rest of the front surface. If necessary, this process may be repeated two or three times until the surface is substantially smooth to a predetermined surface quality or accuracy.

The front surfaces 22 of the mirror bodies 20 of the mirror array are covered with a reflective material 40 to reflect the image 8 from the projector 6. In this manner, the user 4 views the image 8 (formed by the projector 6) using the reflecting surface 16 of the mirror array 14.

Figure 5:
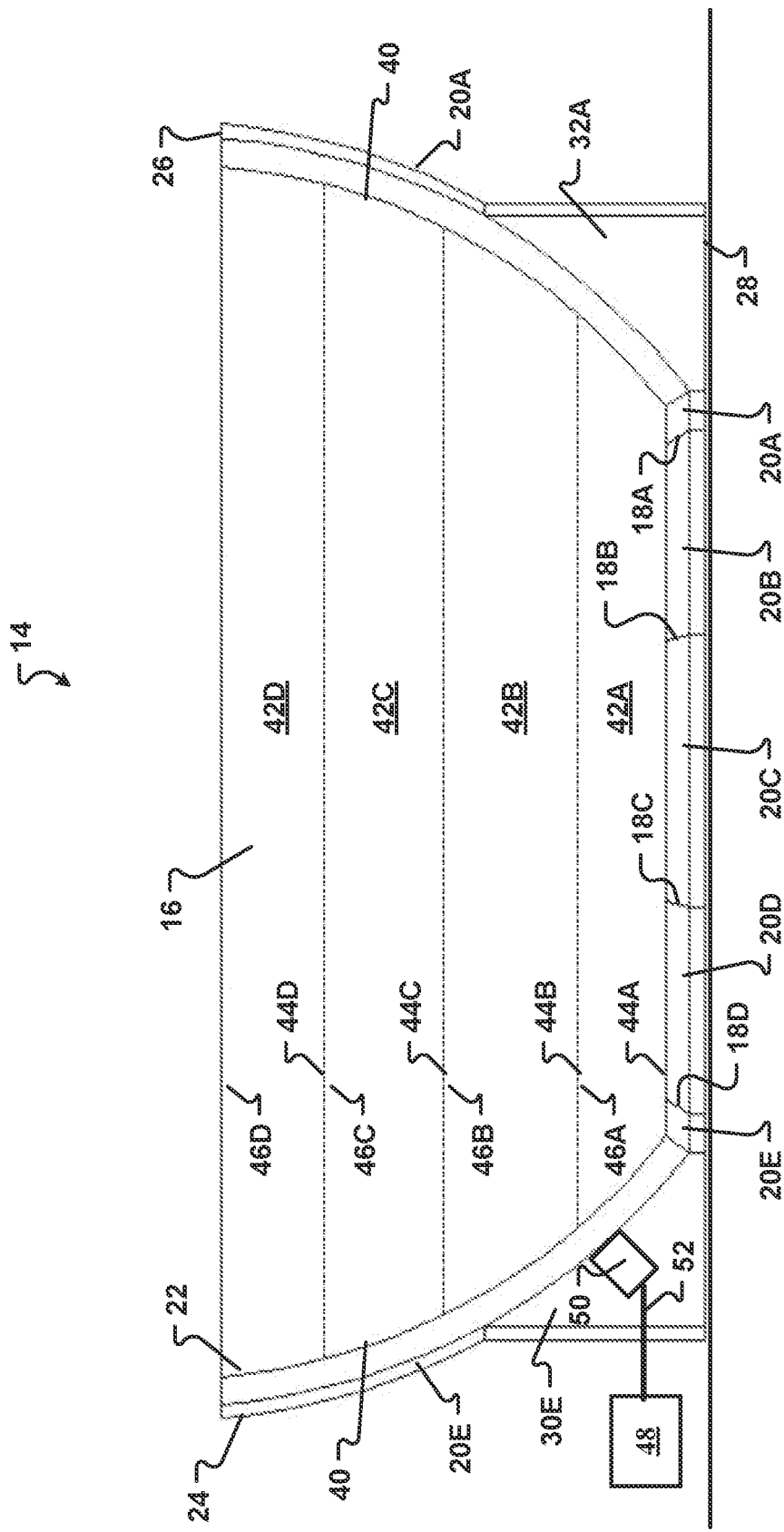
FIG. 5 is a front elevation view of the mirror array of FIG. 2.

Referring now to FIG. 5, the reflective material 40 is generally illustrated positioned on the mirror array 14 according to embodiments of the present disclosure. In this embodiment, the reflective material 40 covers the seams 18 (illustrated in FIGS. 2-4) present if the mirror array includes two or more mirror bodies 20. In this manner, the reflective material 40 provides a reflecting surface 16 for the mirror array without seams which would interrupt the image 8 generated by the projector 6.

Any suitable reflective material 40 may be used with the simulator of the present disclosure. The reflective material 40 may comprise a material that conforms to the shape of the front surfaces 22 of the mirror bodies 20.

In embodiments, the reflective material is rigid. Alternatively, the reflective material 40 is flexible.

In embodiments, the reflective material 40 is applied to the front surfaces in a first state (such as a liquid or a gaseous state). After application to the front surfaces of the mirror bodies, the reflective material changes from the first state to a second state that is different than the first state. In the second state, the reflective material is dimensionally stable and includes suitable reflective qualities. For example, the reflective material 40 may be a paste, a gelcoat or a paint with reflective properties. The reflective material may include pigments that reflect light. In embodiments, the reflective material is cured to change it from the first state to the second state.

The reflective material 40 may optionally be applied to the front surface of a mirror body by a physical vapor deposition method. In embodiments, the front surface 22 of the mirror body may be treated to a desired smoothness by any suitable method known to those of skill in the art (such as by sanding and/or applying a filling material). The mirror body is then be placed in a vacuum chamber with a reflective material in a condensed state. The reflective material may comprise an aluminum alloy or another suitable metal that is either in a solid state or a liquid state.

The reflective material is then treated so that it changes to a vapor phase. While in the vapor phase, the reflective material collects on the front surface (and over any coatings on the first surface). The reflective material then returns to a condensed state as a thin film on the front surface of the mirror body 20. One suitable physical vapor deposition method that can be used to apply a reflective material to the front surface 22 is evaporative physical vapor deposition, although other suitable physical vapor deposition methods can be used.

In embodiments, the reflective material 40 is a sheet 42 with a reflective surface. The sheet 42 has a width between a first edge 44 and a second edge 46. The first and second edges may be approximately parallel. However, the sheet may have any shape or geometric profile selected to cover the front surface 22 of one or more mirror bodies 20. In embodiments, the sheet is cut to an irregular shape for positioning on the front surface of a mirror body 20.

The sheet may have any predetermined thickness. In embodiments, the sheet 42 has a thickness of between about 0.1 mil (0.00254 mm) to about 30 mils (0.762 mm). In another embodiment, the thickness of the sheet 42 is between about 1 mil (0.0254 mm) to about 3 mil (0.0762 mm).

Although the sheet 42 may be of any thickness, the front surface 22 of the mirror body may require different finishing based on the thickness. For example, if the sheet 42 is less than about 3 mils (0.0762 mm) thick, the front surface 22 may need to be smoothed to reduce the surface roughness of the mirror body to a greater degree than for a thicker sheet. Optionally, a coating or fill material is applied to the front surface when the sheet 42 is less than a predetermined thickness.

Any sheet 42 with a suitable reflective surface may be used with the mirror array of the present disclosure. Examples of suitable materials that may be used to form sheets 42 of the reflective material 40 include, but are not limited to, a metalized film, a biaxially-oriented polyethylene terephthalate (BoPET), a polyester film made from stretched polyethylene terephthalate (PET), a metallized PET (polyester) film, a vacuum metallized high gloss PET film, an aluminized polyester film, and a polymer film coated with a metal. One example of a sheet 42 is Mylar®. Other materials with reflective surfaces of suitable optical quality may be used to form the sheets 42.

In embodiments, one sheet 42 of the reflective material 40 is positioned over the front surfaces 22 of the mirror bodies 20 to define the reflecting surface 16 of the mirror array 14. The sheet 42 may be stretched if necessary to reduce or eliminate wrinkles or bubbles. For example, a stretching or other mechanical means may be used to pull the sheet 42 tight and into alignment with the front surface.

In embodiments, a frame is formed with a surface that has a shape which is a negative of a front surface 22 of a mirror array. A reflective surface of the reflective material 40 is positioned against the shaped surface of the frame. The frame with the reflective material is then positioned in a predetermined alignment with the front surface 22 and the frame is subsequently removed to leave the reflective material in position on the mirror array 14.

Alternatively, two or more sheets 42 of the reflective material may be used to cover the front surfaces 22. Optionally, the two or more sheets 42 are joined together by any suitable method.

In embodiments, a first edge 44 of a first sheet 42 is positioned proximate to a second edge 46 of an adjacent second sheet 42. The first edge 44 is optionally positioned less than 0.125 inches (3.175 mm) from the second edge 46. For example, the first edge may be less than about 0.060 inches (1.524 mm), or less than about 0.015 inches (0.381 mm), from the second edge. In some embodiments, the first edge is between approximately 0.005 inches (0.127 mm) and approximately 0.125 inches (3.175 mm) from the second edge. Optionally, at least a portion of the first edge 44 is in contact with or abutting the second edge 46.

Additionally, or alternatively, a portion of the first sheet 42 may overlap and cover a portion of the adjacent second sheet. In embodiments, a portion of the front surface 22 of one or more mirror bodies 20 may be removed under the overlapped portions of two sheets 42 to ensure the outer sheet does not project above a designed shape of the front surface. More specifically, material of the mirror body 20 may be removed from the front surface 22 to account for the double thickness of overlapped portions of two sheets 42 to maintain surface accuracy of the mirror array 14. In embodiments, a portion of the front surface beneath two overlapped sheets 42 may be sanded or otherwise mechanically worked to remove material to a depth equal to the thickness of one sheet 42 of the reflective material.

Additionally, or alternatively, when two sheets 42 are overlapped, the sheets may be cut through the overlapped portion. The cut ends of the sheets may then be removed to leave an abutted joint between the two sheets 42.

Overlapping two sheets 42 of reflective material 40 may cause distortions visible to a user if the sheets 42 are too thick. Accordingly, for thicker sheets it may be beneficial to position the first and second edges 44, 46 of two adjacent sheets 42 adjacent to each other without overlapping to prevent distortions in the reflecting surface 16 caused by overlapping the edges. However, when the sheets 42 are less than approximately 5 mils (0.127 mm), or less than approximately 3 mils (0.0762 mm), overlapping edges 44, 46 of adjacent sheets 42 and the resulting double thickness of the sheets is not expected to cause distortions visible to a user 4.

The distance that a first edge 44 of a first sheet 42 extends over a second edge 46 of a second adjacent sheet 42 optionally is limited to a predetermined amount to decrease the area that may cause a distortion visible to the user. For example, the distance that the first sheet overlaps the second sheet may be limited to less than approximately 5 mm. In embodiments, the first edge 44 of the first sheet 42 overlaps the second edge 46 of the second adjacent sheet by from about 0.1 mm to about 5 mm.

The sheets 42 may be positioned on the mirror array 14 in any orientation. Each sheet 42 may cover a portion of one or more of the mirror bodies 20. Optionally, the sheets 42 are oriented approximately horizontally as generally illustrated in FIG. 5. In embodiments, each sheet extends from a first side to a second side of the mirror array. In another embodiment, the sheets 42 are oriented approximately vertically. Accordingly, a sheet of the reflective material may run from a bottom to a top of the front surface 22. In another embodiment, the sheet of reflective material may have a diagonal orientation.

The edges 44, 46 of the sheets 42 are illustrated in broken lines in FIG. 5 for clarity. However, as will be appreciated by one of skill in the art, after the sheets are positioned on the mirror array, the edges will not be visible to a user 4 as generally illustrated in FIGS. 2 and 4.

The reflective material 40 is positioned on the front surfaces 22 of the mirror bodies 20 in any appropriate manner. In embodiments, the reflective material is affixed to a portion of a mirror body. Optionally, an adhesive is used to affix the reflective material to the mirror body. For example, an adhesive may be applied to a front surface 22 of a mirror body 20 to affix a sheet 42 to the front surface.

Additionally, or alternatively, a fastener can be used to affix a sheet 42 to the mirror body 20. Any suitable fastener known to those of skill in the art may be used. Accordingly, a pin, a fastener, such as a clip, a staple, a strap, a thread, a tape, a nail, and screw, may be used to affix the sheet 42 of reflective material 40 to a mirror body.

Optionally, static electricity may additionally (or alternatively) be used to retain the sheet of the reflective material 40 in a predetermined position with respect to the front surface 22 of a mirror body. In embodiments, an electrostatic charge is applied to one or more of the mirror array 14 and the sheet 42 to facilitate the retention of the sheet in a predetermined position with respect to the front surfaces 22 of the mirror bodies. In embodiments, during installation of the reflective material 40, a static electric charge is added to sheets by any means known to those of skill in the art. For example, a worker may rub the sheets with a suitable material to induce the static electric charge.

Additionally, or alternatively, the sheet 42 of the reflective material is retained in a predetermined position with respect to the front surface 22 by suction. In this embodiment, a pump 48 is used to draw air through the mirror array and the front surfaces 22 of the mirror bodies. The pump can be configured to apply any suitable amount of suction below atmospheric pressure. In embodiments, a suction of between approximately 1 kPA and approximately 35 kPa below atmospheric pressure is used to retain the sheet in the predetermined position.

In embodiments, the mirror body 20 is formed of a material that is at least partially porous. In another embodiment, the material used to form the mirror body has a density that is less than glass used to form prior art mirrors.

The material used to form the mirror body 20 may be a rigid foam. The rigid foam may have an open cell structure. Alternatively, the rigid foam has a closed cell structure. In embodiments, the rigid foam is substantially dimensionally stable. As used herein, substantially dimensionally stable means the material used to form the mirror body 20 may expand or contract by between about 0.01% and about 0.5%, or less than about 0.1%.

Any suitable foam known to those of skill in the art may be used to form the mirror body 20. The mirror body 20 may comprise one or more of: (a) a polyurethane foam; (b) a polyethylene foam; (c) a polystyrene foam; (d) a polyisocyanurate foam; (e) a thermosetting polymer (or plastic); (f) a metal foam (such as an aluminum foam); (g) a syntactic foam comprising a composite of a first material (such as a metal, polymer, or ceramic matrix) and a second material (which may be one or more of hollow spheres and solid spheres); (h) a cellulose foam; and (i) a high density urethane foam. In embodiments, the mirror body 20 is formed of a tooling foam known to those of skill in the art.

The foam of the mirror body may have any desired density. In embodiments, the density of the foam is between approximately 3 lbs/ft$^3$ (48 kg/m$^3$) to approximately 40 lbs/ft$^3$ (641 kg/m$^3$), or approximately 12 lbs/ft$^3$ (192 kg/m$^3$).

Optionally, the mirror body 20 is adapted to facilitate drawing air through the front surface to create suction for the sheet 42. For example, a plurality of perforations or apertures may be formed through the front surface 22 to facilitate airflow through the front surface.

In embodiments, at least a portion of the exterior surface of the mirror body 20 is treated to prevent airflow therethrough. In this manner, suction is maintained (or concentrated) through front surface 22.

In embodiments, one or more of the rear surface, the top surface, the bottom surface, the first side, and the second side is treated to prevent airflow. Any suitable manner of preventing airflow may be used. The treatment may include applying a non-porous material to the exterior of the mirror body. In embodiments, the non-porous material is a metal, a plastic, or a wood.

Additionally, or alternatively, the non-porous material may be a coating. In embodiments, the coating is a paint or a sealant that is applied to selected portions of the mirror body to prevent airflow therethrough.

Referring again to FIG. 1, the mirror body may also include a valve or fitting 50 to connect to a conduit 52. The conduit 52 is connectable to a pump 48 to draw air through the mirror body 20. Although the fitting 50 is illustrated proximate to a rear surface 24 of the mirror body 20, air may be drawn out of the mirror body through any of the rear surface, the top surface, and the bottom surface. For example, FIG. 7 illustrates an embodiment of a mirror body 20 with a fitting 50 for the pump 48 positioned on the bottom surface 28.

In operation, the pump 48 draws air through the conduit 52 to create a suction proximate to the front surface 22. In embodiments, the pump 48 is run substantially continuously. Alternatively, the pump 48 may only be run to initially position the sheet 42 on the mirror array 14. Accordingly, in some embodiments, the pump 48 is not used during operation of the simulator 2.

A mirror body 20 of the present disclosure may be formed by any means known to those of skill in the art. In embodiments, a mirror body 20 is cast such that the front surface 22 has a predetermined shape. Alternatively, in another embodiment, the mirror body 20 is formed by an additive manufacturing process. In another embodiment, the mirror body 20 is formed by injection molding a plastic or a rubber material.

Figure 10:
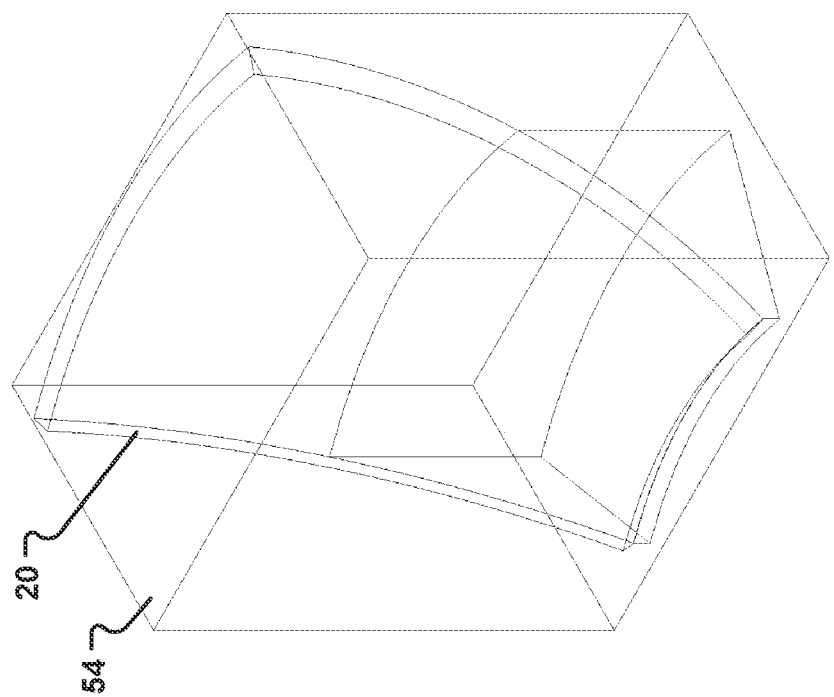
FIG. 10 is another perspective view of the block of FIG. 9 and illustrating a mirror body shown in hidden lines within the block.
Figure 9:
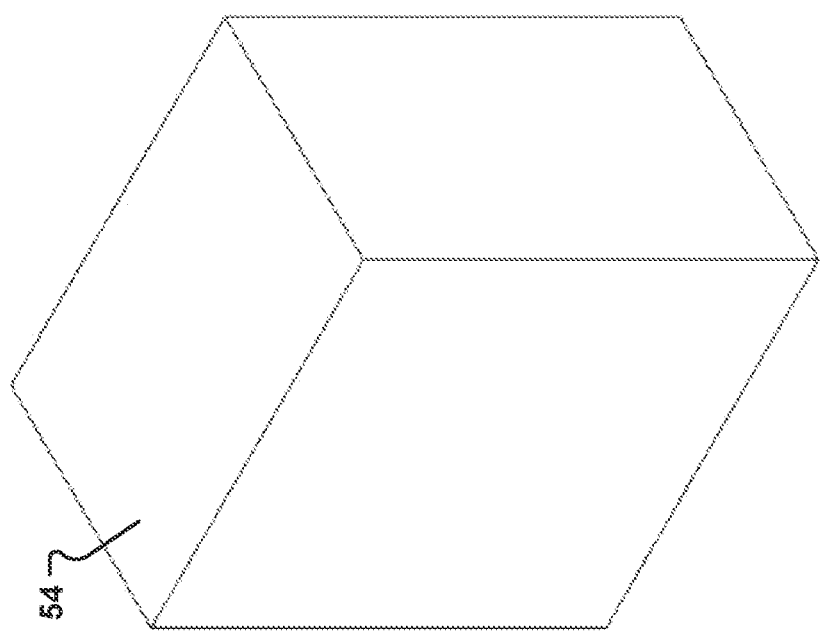
FIG. 9 is a perspective view of a block of a substrate used to form a mirror body.

Referring now to FIGS. 9-10, in embodiments of the present disclosure, the mirror body 20 is formed by carving or machining a block 54 of a suitable material. The block 54 may be of any size and shape.

In embodiments, the block is formed of a rigid foam. The block may include, but is not limited to, one or more of: a polyurethane foam; a polyethylene foam; a polystyrene foam; a polyisocyanurate foam; a thermosetting polymer (or plastic); a metal foam (such as an aluminum foam); a syntactic foam; a cellulose foam; and a high density urethane foam.

Any suitable method of shaping the mirror body 20 out of the block 54 may be used. Optionally, the block 54 is cut to form the mirror body. Additionally, or alternatively, the block is milled to remove material. In another embodiment, a laser is used to burn or cut material from the block.

In embodiments, a Computer Numerical Control (CNC) mill or a similar device is used to remove material from the block 54 to form the mirror body 20. As will be appreciated by one of skill in the art, surfaces of the mirror body 20 may require additional processing after initial formation by the CNC mill or other tools. For example, the front surface 22 may be polished or smoothed to mechanically remove some of the material of the mirror body 20. In some embodiments, the front surface 22 may be sanded after the initial formation. Additionally, or alternatively, a coating or filler may be applied to the front surface as described herein.

Figure 11:
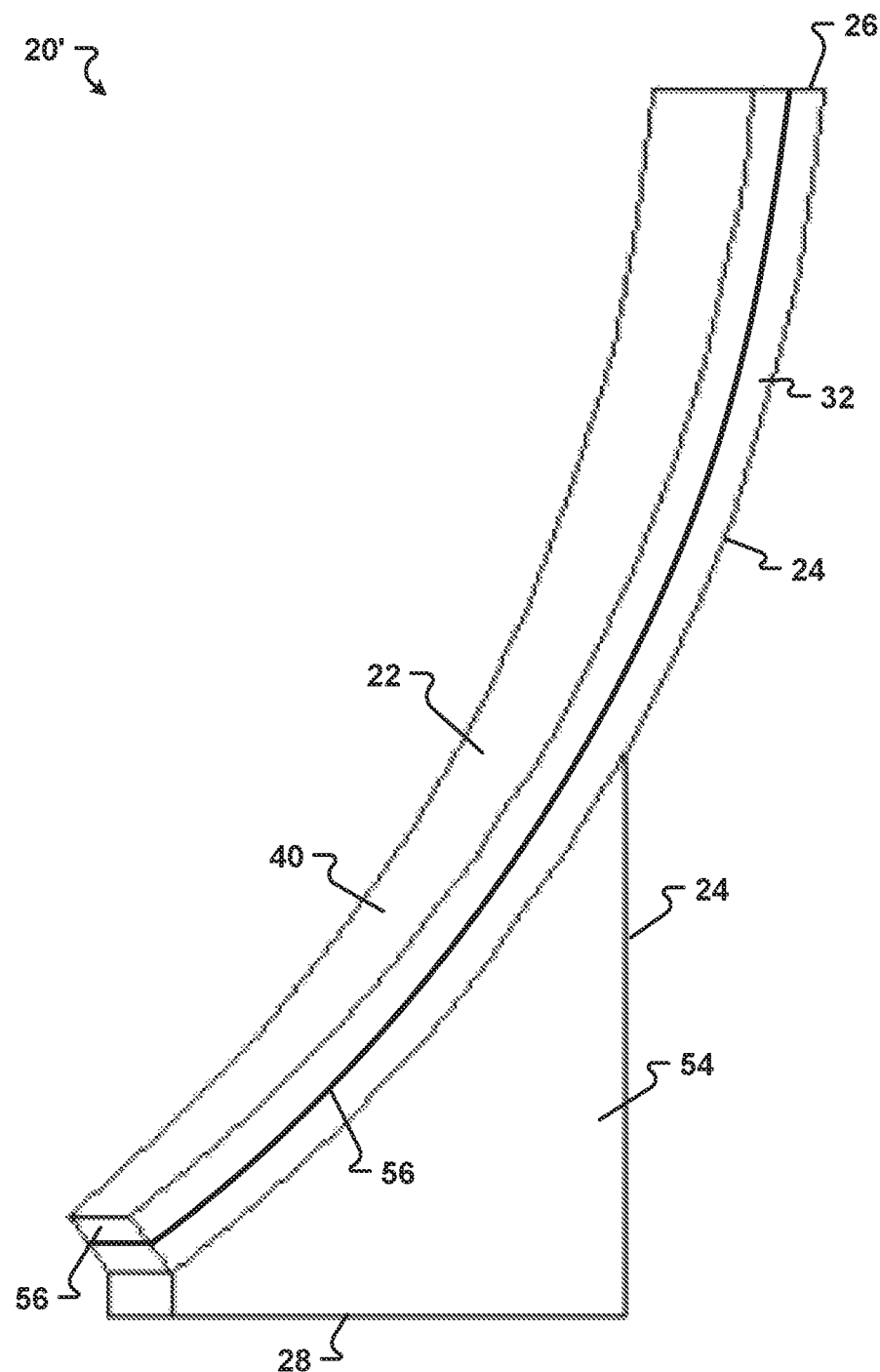
FIG. 11 is a right side elevation view of a mirror body which is formed of two materials according to embodiments of the disclosure.

Referring now to FIG. 11, a mirror body 20' according to some embodiments of the present disclosure is generally illustrated. The mirror body 20' is formed of two or different materials. For example, in embodiments, a block 54 of a first material is formed as described herein. The first material optionally is a first foam. Portions of the block 54 are removed to form a first portion of the mirror body 20' with a top surface 26, a bottom surface 28, a first side, and a second side 32.

A second portion of the mirror body 20' is defined by an insert 56 that is formed from a second material. The insert 56 includes a front surface 22 with a predetermined shape.

The second material is different than the first material. Optionally, the second material has different material properties than the first material.

The second material may be a second foam. Additionally, or alternatively, the insert 56 may comprise one or more of the second foam, a plastic, a glass, or a metal. In some embodiments, the first foam has a first density and the second foam has a second density that is higher than the first density.

The insert 56 is formed by any suitable method, including one or more of casting, additive manufacturing, or any other method described herein. In embodiments, portions of the insert 56, such as the front surface 22, are reshaped by removing material by any suitable method, including sanding, milling, cutting, heating, and the like.

In embodiments, the insert 56 is cast over a front surface of the block 54 to form the mirror body 20'. Alternatively, in another embodiment, the insert 56 is formed separately from the block 56. Thereafter, the insert is joined to the bock 54 by any method known to those of skill in the art to form the mirror body 20'. In embodiments, the insert 56 is adhered or glued to the block 56. Additionally, or alternatively, a mechanical fastener can be used to interconnect the insert to the block.

A reflective material 40 is applied to the front surface 22 of the insert 56 either before or after the insert is attached to the block 54. The reflective material 40 may be any reflective material described herein or that is developed in the future.

In some embodiments, the reflective material 40 is a sheet 42. Alternatively, the reflective material is applied to the front surface by a physical vapor deposition method. In this embodiment, the reflective material may comprise a metal.

Forming a mirror body 20' of at least two materials provides several benefits. The first and second materials can be selected based on beneficial material properties. For example, the first material may be selected based on its suitability for a finishing method (for example, machining or sanding). The first material may also be selected to provide a desired rigidity, smoothness, density, or porosity. Similarly, the second material may be selected to facilitate a forming method (such as casting).

In embodiments, the second material is a foam selected to be cast to form the insert 56 with a front surface 22 that has a smoothness that requires little or no additional finishing. For example, the second material may not require sanding or coating to achieve a desired smoothness. Alternatively, the second material is a glass or a plastic.

Figure 12:
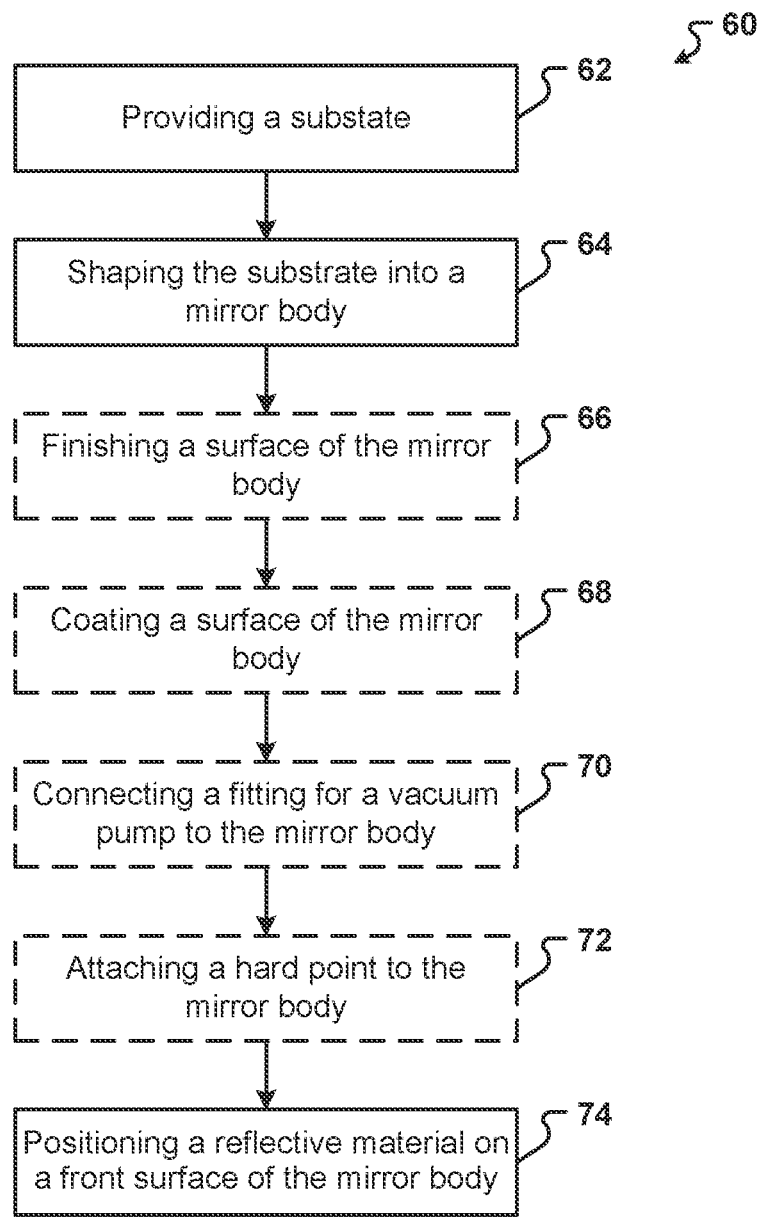
FIG. 12 is a flow chart illustrating a method of forming a mirror body according to embodiments of the present disclosure.

Referring now to FIG. 12, a method 60 of forming a mirror body 20 for a mirror array 14 of a simulator 2 according to embodiments of the present invention is generally illustrated. While a general order of the operations of method 60 are shown in FIG. 12, it will be understood by one of skill in the art that the operations of the method can be arranged and performed differently than those shown in FIG. 12. Further, although the operations of the method may be described sequentially, many of the operations may in fact be performed in parallel or concurrently. Moreover, some of the operations are optional and may not be performed. The operations of method 60 shall be explained with reference to the components described in conjunction with FIGS. 1-11.

In operation 62, a substrate that will form a mirror body 20 is provided. The substrate may be any suitable material that is substantially dimensionally stable after the mirror body is formed.

The substrate may be a liquid that is substantially rigid when set or cured. Alternatively, the substrate may be a solid. In embodiments, the substrate is a porous material.

In embodiments, the substrate is a foam. Any suitable foam may be use. For example, the substrate may comprise one or more of a polyurethane foam, a polyethylene foam, a polystyrene foam, a polyisocyanurate foam, a thermosetting polymer (or plastic), a metal foam, a syntactic foam, a cellulose foam, and a high density urethane foam.

Optionally, two or more substrates may be used to form a mirror body 20'. In embodiments, a first portion of the mirror body 20' is formed of a first material (or a first substrate) and a second portion of the mirror body is formed of a different second material (or a second substrate). The second substrate may be used to form the front surface 22 of the mirror body. The first substrate may be a first foam. The second substrate may comprise one or more of a second foam, a plastic, a glass, or a metal.

In operation 64, the substrate is shaped or formed into a mirror body 20. Any suitable means may be used to form the mirror body 20 from the substrate. In embodiments, the substrate is used in an additive manufacturing process to form the mirror body.

Additionally, or alternatively, the mirror body 20 (or a portion of the mirror body) is cast from the substrate such that the front surface 22 has a predetermined shape. A mold or a form may be used to cast the substrate into the mirror body. In embodiments, after a first portion of a mirror body 20' is formed from a first substrate, a second portion of the mirror body is formed by casting a second substrate onto the first mirror body portion. In another embodiment, a second portion of the mirror body 20' comprises an insert 56 with a front surface 22 of a predetermined shape that is joined to the first mirror body portion.

In another embodiment, the substrate is a plastic or a rubber material. In this embodiment, operation 64 includes molding the plastic or rubber substrate into the mirror body 20. Optionally, an injection molding process may be used to form the mirror body of the plastic or the rubber substrate.

Additionally, or alternatively, operation 64 may include forming the mirror body 20 by mechanically removing material. For example, a block 54 of the substrate may be cut or milled to form the mirror body. The substrate may be any one or more of the foams described herein. Optionally, a CNC machine or similar device may be used to form the mirror body from the block 54. Additionally, or alternatively, a laser is used to cut the block 54. A combination of two or more methods of forming a substrate described herein may be performed in any order or sequence to form the mirror body.

When forming the mirror body in operation 64, a front surface 22 of the mirror body 20 is formed to have a shape adapted to reflect light from a light source 6 such as a projector, an LED panel, or an OLED screen. In embodiments, the front surface 22 has a shape adapted to collimate light scattered from a diffusion screen 12 that is illuminated by the light source 6 of the simulator 2. Alternatively, the front surface may have a shape to reflect light when directly illuminated by the light source 6.

The front surface 22 can have any required shape and geometry. For example, the front surface may have any combination of convex, concave, flat, and free-form shapes known to those of skill in the art. In embodiments, the front surface 22 may have a shape that includes at least a section of one or more of a circle, a sphere, a parabolic, an ellipsoid, a plane, a freeform, and combinations thereof.

The method 60 may include optional operation 66 in which a surface of the mirror body is finished. This may include altering the front surface 22 of the mirror body to obtain a desired surface quality.

In embodiments, the finishing of operation 66 includes sanding the front surface. Any suitable abrasive material or product (such as a sandpaper, a grinding block, a file, etc) may be used. The abrasive material may optionally have a grit of between about 400 and about 1,000. In another embodiment, the front surface may be treated with heat or by a flame.

In optional operation 68, a coating may be applied to a surface of the mirror body. For example, a filling material may be applied to the front surface. The filling material may be a polyester body filler.

Additionally, or alternatively, operation 68 may include applying a coating to one or more of a rear surface, a top surface, a bottom surface, a first side, and a second side of the mirror body 20 to prevent airflow therethrough. As described herein, in this manner loss of suction through the front surface is prevented if a vacuum force is used to position a reflective material on the front surface.

In embodiments, method 60 includes connecting a fitting 50 to the mirror body in optional operation 70. The fitting 50 is adapted to connect to a conduit 52 of a vacuum pump 48. In this manner, the vacuum pump 48 can draw air through the mirror body 20 to create a vacuum proximate to the front surface 22.

Operation 70 may also include perforating the mirror body 20 to facilitate airflow therethrough to create a vacuum proximate to the front surface. More specifically, if the substrate used to form the mirror body 20 is not sufficiently porous, or if a coating or filling material applied to the front surface 22 is not porous, apertures or perforations may be formed to facilitate airflow through the mirror body. In embodiments, when the mirror body 20' is formed of two different substrates (such as a first substrate with a low density and a second substrate with a higher density), perforations may be formed through at least the second substrate, such as an insert 56 joined to a first portion of the mirror body.

The perforations may be formed by any suitable method. For example, perforations could be made mechanically (with a drill bit in a mill), by laser, or by a fluid (such as a water jet or a gas at high pressure).

The method 60 may optionally include operation 72 that includes attaching a hard point 38 to the mirror body. The hard point 38 may subsequently be used to connect the mirror body to a second mirror body. Additionally, or alternatively, the hard point can connect to a frame or support of a simulator.

Operation 74 includes positioning a reflective material 40 on the front surface 22 of the mirror body 20. In some embodiments, the reflective material is positioned on the front surface before the mirror body 20 is positioned adjacent to a second mirror body in a mirror array 14. Alternatively, the reflective material 40 is positioned on the front surface after the mirror body is positioned adjacent to the second mirror body.

In embodiments, the reflective material 40 is in a first state (such as a liquid or a paste) when applied to the front surface 22 of the mirror body 20. The reflective material 40 subsequently changes to a solid after being applied to the front surface.

Alternatively, the reflective material 40 is a sheet 42 with a reflective surface. The method optionally includes cutting the sheet 42 to fit the front surface.

In embodiments, the method includes joining a first sheet of the reflective material to a second sheet of the reflective material. Any suitable means may be used to join the first and second sheets.

A first edge of the first sheet may be positioned proximate to a second edge of the second sheet. Optionally, the first edge of the first sheet overlaps the second sheet.

In embodiments, an adhesive is used to retain the reflective material 40 in a predetermined orientation with respect to the front surface 22. Additionally, or alternatively, a mechanical fastener is used to position the reflective material relative to the front surface. In at least some embodiments, static electricity is used to retain the reflective material on the front surface. In still another embodiment, a vacuum is used to retain the reflective material relative to the front surface.

In embodiments, operation 74 comprises positioning a reflective material 40 on an insert 56. The reflective material may be a sheet 42 applied to the insert. Alternatively, the reflective material is applied to the front surface 22 of the insert 56 by a physical vapor deposition method. Any reflective material suitable for use in the physical vapor deposition method may be used. In embodiments, the reflective material 40 is a metal. The reflective material may be positioned on the insert 56 before or after the insert is attached to a first portion of the mirror body 20'.

Figure 13:
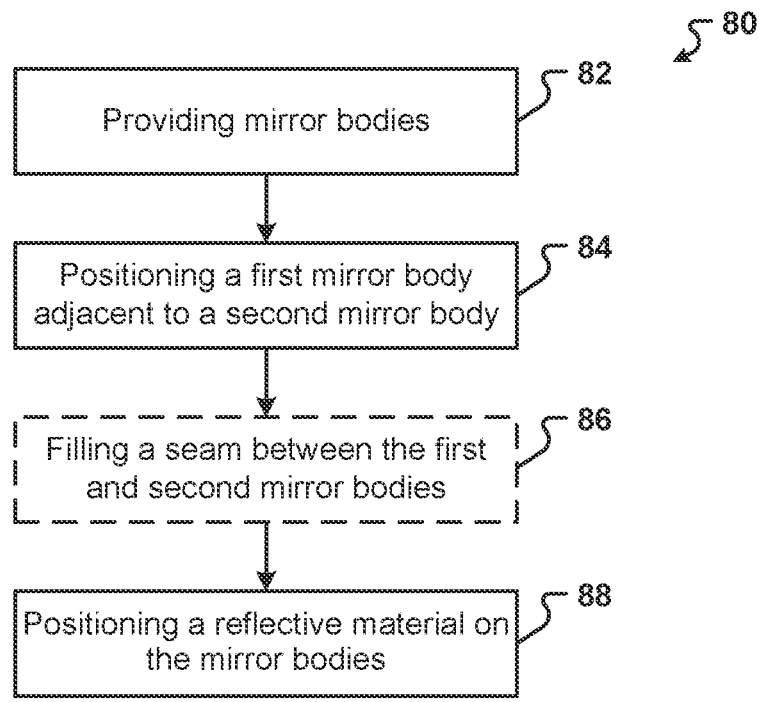
FIG. 13 is a flow chart illustrating one embodiment of a method of forming a mirror array for a simulator.

Referring now to FIG. 13, a method 80 of forming a mirror array 14 of a simulator 2 according to embodiments of the present invention is generally illustrated. While a general order of the operations of method 80 are shown in FIG. 13, it will be understood by one of skill in the art that the operations of the method can be arranged and performed differently than those shown in FIG. 13. Further, although the operations of the method may be described sequentially, many of the operations may in fact be performed in parallel or concurrently. Moreover, some of the operations are optional and may not be performed. The operations of method 80 shall be explained with reference to the components and methods described in conjunction with FIGS. 1-12.

Operation 82 includes providing one or more mirror bodies 20. The mirror bodies are formed at least partially of a light-weight substrate as described herein. In embodiments, the light-weight substrate is a foam. Optionally, two or more substrates are used to form a mirror body 20'. The mirror bodies may be formed according to method 60.

In operation 84, a first mirror body is positioned adjacent to a second mirror body. The mirror bodies are arranged in a predetermined orientation. Optionally, the first and second mirror bodies 20 are interconnected or joined together in any suitable manner. Additionally, or alternatively, the mirror bodies may be interconnected to a frame of the simulator.

In optional operation 86, a seam 18 between adjacent mirror bodies may be filled. Any suitable filling material may be used to fill the seam. In embodiments, operation 86 includes sanding the filling material after it is set such that the filling material is substantially even with front surfaces of the adjacent mirror bodies 20.

Operation 88 comprises positioning a reflective material on the front surfaces 22 of the mirror bodies 20. The reflective material covers the seam 18 between adjacent mirror bodies 20.

The reflective material 40 may be a liquid or a paste when applied to the front surfaces 22 of the mirror bodies 20. Thereafter, the liquid or past hardens to a solid state.

Alternatively, the reflective material 40 is a sheet 42 with a reflective surface. The method may include cutting a sheet of the reflective material. Optionally, two or more sheets of the reflective material are used to cover the front surfaces. In embodiments, the method includes joining a first sheet to a second sheet of reflective material.

In embodiments, a chemical fastener is used to retain the reflective material in a predetermined orientation with respect to the front surfaces. The chemical fastener may be an adhesive.

Additionally, or alternatively, a mechanical fastener is used to position the reflective material relative to the front surfaces. The mechanical fastener may be a clip, a staple, a nail, and screw or any other mechanical fastener known to those of skill in the art.

In some embodiments, static electricity is used to retain the reflective material on the front surface. Additionally, or alternatively, in still other embodiments, a vacuum is used to suck the reflective material against the front surfaces.

In another embodiment, operation 88 includes attaching an insert 56 to a first portion of a mirror body 20'. The insert 56 may include a reflective material 40 positioned on a first surface 22 of the insert before the insert is attached to the mirror body first portion. In embodiments, the insert 56 is formed of a glass or a plastic. Alternatively, the insert 56 is formed of a foam. The front surface 22 of the insert may be coated with the reflective material 40 by any suitable means. In embodiments, the reflective material comprises a metal, such as aluminum, applied to the front surface by a physical vapor deposition method.

The mirror array 14 of the present disclosure provides many benefits compared to prior art mirror arrays. For example, the mirror arrays 14 of all embodiments of the present disclosure will have significantly less distortion than a vacuum-formed mirror throughout the reflecting surface 16 due to the rigid backing provided by the front surface 22 of the mirror body 20. Specifically, the front surface 22 provides support to the reflective material 40 to maintain the shape of the reflecting surface 16 up to the edges of the mirror array 14. In contrast, the reflective surface of a vacuum-formed mirror is distorted as the reflective material is sucked into a hollow interior of a frame.

A vacuum-formed mirror is also prone to rips or sudden decompression "popping" events. These rips may cause a catastrophic failure of the vacuum-formed mirror and require significant time to repair. In contrast, the mirror array 14 of the present disclosure is much more durable since there is no vacuum required to shape the mirror. For example, a tool dropped on the mirror array 14 may cause a small divot in the mirror body 20. However, this damage can be repaired a filler, such as Bond-O or a similar material.

Additionally, the mirror array 14 of the present disclosure is easier to repair than a vacuum-formed mirror. Specifically, the reflecting surface 16 of the mirror array 14 can be repaired or replaced without disassembly or removal of structural components of the mirror array and/or a motion platform of the simulator. This is beneficial because if the reflecting surface 16 is degraded by dust accumulation, handprints, scratches and the like, the reflective material 40 can be removed and replaced akin to wallpapering a room without significant disassembly of the simulator 2 or the mirror array 14.

Another benefit is that the mirror array 14 of embodiments of the present disclosure is significantly lighter than a prior art mirror array of similar dimensions that is formed of rigid glass mirrors. The mirror bodies 20 of the present disclosure may be formed of a material with a density that is less than the density of the glass substrate and supporting metal frame used to form a rigid glass mirror. As will be appreciated by one of skill in the art, the supporting metal frame of a rigid glass mirror may be more than half of the total weight of a mirror array for a rigid glass mirror. In some embodiments, the mirror arrays of the present disclosure weigh less than half that of a similarly sized rigid glass mirror array. The reduced weight of the mirror array of the present disclosure reduces transportation and handling costs, reduces the expense of the structure of the simulator, and reduces maintenance costs.

The mirror array 14 of the present disclosure also requires significantly less manufacturing time and cost compared to a prior art mirror array with rigid glass mirrors of a similar size and geometry. Specifically, the mirror arrays 14 described herein eliminate glass mirror grinding, polishing, dimensioning, mirror frame mounting, and coating in a vacuum chamber that are required to produce the prior art mirror array.

Compared to rigid glass mirrors for a prior art mirror array, the mirror array 14 of the present disclosure will have a much lower risk of shipping damage since the mirror bodies 20 can be shipped separately and without the reflective material applied. The mirror bodies 20 can be assembled to form a mirror array 14 at the site and then "skinned" with the reflective material 40. Thus, the reflecting surface 16 of the mirror array will not be damaged during shipment of mirror bodies. Any incidental damage to the shaped front surface 22 of a mirror body 20 can be repaired with a filler and then sanded, if necessary, to match the original shape.

In some embodiments, sheets 42 of the reflective material 40 can be pre-cut to the geometry required to cover the front surfaces 22 of the mirror bodies 20. The pre-cut sheets 42 may then be shipped to the installation site protected inside a shipping tube. In this manner, the reflective surface of the sheets 42 is protected from incidental damage and dust.

Another benefit of the mirror arrays 14 of some embodiments of the present disclosure is there will be no visible seams between adjacent mirror bodies 20. In contrast, prior art mirror arrays with rigid glass mirrors have visible seams that result from the air gaps between glass mirror segments. Some prior art rigid glass mirror arrays have seam gaps of at least 0.06 inches (1.524 mm) between glass mirror segments. These seams form visible lines which interfere with an image reflected from the mirror array. In some embodiments of the present disclosure, seams between adjacent mirror bodies 20 are less than 0.06 inches (1.524 mm). For example, in embodiments of the present disclosure, a seam between adjacent mirror bodies may be between about 0.01 inches (0.254 mm) and about 0.06 inches (1.524 mm), or about 0.03 inches (0.762 mm).

Another benefit of the present disclosure is the ability to create collimating mirrors for a simulator 2 that are non-spherical, which is not possible using conventional methods of vacuum formed film mirrors or glass substrate mirrors. When using spherical concave mirrors as collimating mirrors, the vertical field of view is limited to just over 60° because the optical layout is a compromise of unobstructed field of view, proper collimation and acceptable distortion. However, as with searchlight and lighthouse mirrors, collimated light is created best when the mirror is a parabolic shape. When creating mirrors for collimated displays using the present disclosure, the shape can be spherical or the shape can be parabolic, ellipsoid, or any combination of freeform shape that results in a larger field of view than is possible with spherical mirrors, or that has better collimation and distortion performance for the same field of view.

While various embodiments of the system and method have been described in detail, it is apparent that modifications and alterations of those embodiments will occur to those skilled in the art. It is to be expressly understood that such modifications and alterations are within the scope and spirit of the present disclosure. Further, it is to be understood that the phraseology and terminology used herein is for the purposes of description and should not be regarded as limiting. The use of "including," "comprising," or "having" and variations thereof herein are meant to encompass the items listed thereafter and equivalents thereof, as well as additional items. Further, it is to be understood that the claims are not necessarily limited to the specific features or steps described herein. Rather, the specific features and steps are disclosed as embodiments of implementing the claimed systems and methods.

It is to be appreciated that any feature described herein can be claimed in combination with any other feature(s) as described herein, regardless of whether the features come from the same described embodiment. Specifically, features of one aspect or embodiment of the present disclosure may be combined with other aspects or embodiments disclosed herein. Accordingly, it is contemplated that various aspects, features and devices shown and/or described with respect to one embodiment may be combined with (or substituted for) aspects, features or devices of other embodiments regardless of whether or not such a combination or substitution is specifically shown or described herein.

To provide additional background, context, and to further satisfy the written description requirements of 35 U.S.C. § 112, the following references are incorporated by reference herein in their entireties: U.S. Pat. Nos. 3,549,803; 6,176,588; 6,206,531; 7,708,561; 10,422,933; U.S. Pat. App. Pub. 2004/0121193; U.S. Pat. App. Pub. 2006/0012895; U.S. Pat. App. Pub. 2008/0043352; U.S. Pat. App. Pub. 2015/0378128, U.S. Pat. App. Pub. 2022/0011480.

What is claimed is:

1. A mirror for a simulator, comprising:
   a body including a front surface, a rear surface, a top surface, a bottom surface, a first side, and a second side, comprising:
   a rigid foam defining a first portion of the body; and
   an insert formed of a second material, wherein the insert defines a second portion of the body and the front surface, and wherein the front surface has a shape adapted to reflect light that originates in a projector of the simulator to a user; and
   a reflective material covering the front surface to reflect the light from the projector, wherein the reflective material is one or more of: (a) a metalized film; (b) biaxially-oriented polyethylene terephthalate (BoPET); (c) a polyester film made from stretched polyethylene terephthalate (PET); (d) a metallized PET (polyester) film; (e) a vacuum metallized high gloss PET film; (f) an aluminized polyester film; (f) a polymer film coated with a metal; and (g) a material applied to the front surface in a first state and the material subsequently changes to a solid state.

2. The mirror of claim 1, wherein the insert is joined to the first portion by at least one of:
   a chemical fastener such as an adhesive; and
   a mechanical fastener such as a clip, a staple, a nail, or a screw.

3. The mirror of claim 1, wherein the second portion is formed of a glass.

4. The mirror of claim 1, wherein the insert comprises one or more of a plastic, a glass, a metal, and a second foam, wherein the second foam has a second density that is different than a first density of the rigid foam of the first portion of the body.

5. The mirror of claim 1, wherein the shape of the front surface is adapted to collimate light scattered from a diffusion screen that is illuminated by the projector.

6. The mirror of claim 1, wherein the rigid foam is one or more of a polyurethane foam, a polyethylene foam, a polystyrene foam, a polyisocyanurate foam, a thermosetting polymer (or plastic), a metal foam, a syntactic foam, a cellulose foam, and a high density urethane foam.

7. The mirror of claim 1, wherein the reflective material comprises a paint with reflective qualities, and wherein the first state is a liquid.

8. The mirror of claim 1, wherein the reflective material is applied to the front surface by a physical vapor deposition method during which the first state of the reflective material is a vapor phase.

9. A mirror array for a simulator, comprising:
   a first mirror body positioned adjacent to a second mirror body, wherein the mirror bodies comprise first portions formed of a foam, and wherein second portions of the mirror bodies are defined by inserts formed of a second material, the inserts defining front surfaces of the first and second mirror bodies; and
   a reflective material covering the front surfaces of the inserts.

10. The mirror array of claim 9, wherein the reflective material is applied to the front surfaces of the inserts in a first state and subsequently changes to a solid state.

11. The mirror array of claim 9, wherein the foam is one or more of: a polyurethane foam, a polyethylene foam, a polystyrene foam, a polyisocyanurate foam, a thermosetting polymer (or plastic), a metal foam, a syntactic foam, a cellulose foam, and a high density urethane foam, and wherein the reflective material is a sheet of one or more of: a metalized film, biaxially-oriented polyethylene terephthalate (BoPET), a polyester film made from stretched polyethylene terephthalate (PET), a metallized PET (polyester) film, a vacuum metallized high gloss PET film, an aluminized polyester film, and a polymer film coated with a metal.

12. The mirror of claim 9, wherein the reflective material is applied to the front surfaces of the inserts by a physical vapor deposition method.

13. The mirror of claim 9, wherein the inserts comprise one or more of a plastic, a glass, a metal, and a second foam, wherein the second foam has a second density that is different than a first density of the foam of the first portions of the mirror bodies.

14. A method of forming a mirror body for a simulator, comprising:
   shaping a substrate into a mirror body which includes a front surface with a geometry adapted to reflect light that originates in a projector of the simulator, wherein the mirror body is rigid, and wherein the substrate is one or more of:
   a polyurethane foam, a polyethylene foam, a polystyrene foam, a polyisocyanurate foam, a thermosetting polymer (or plastic), a metal foam, a syntactic foam, a cellulose foam, a high density urethane foam, a plastic, a fiberglass, a metal, a rubber, and a wood; and
   covering the front surface with a reflective material to reflect the light from the projector.

15. The method of claim 14, wherein shaping the substrate comprises milling a block of the substrate into the mirror body.

16. The method of claim 14, wherein the reflective material is one of:
   a sheet of one or more of: a metalized film, biaxially-oriented polyethylene terephthalate (BoPET), a polyester film made from stretched polyethylene terephthalate (PET), a metallized PET (polyester) film, a vacuum metallized high gloss PET film, an aluminized polyester film, and a polymer film coated with a metal; or
   a material applied to the front surface in a first state that subsequently changes to a solid state.

17. The method of claim 16, wherein covering the front surface with the reflective material comprises one or more of:
   cutting the sheet to fit the front surface;
   affixing the reflective material to the mirror body with a chemical fastener;
   affixing the reflective material to the mirror body with a mechanical fastener;
   drawing air through the front surface to create a suction;
   applying an electrostatic charge to one or more of the front surface and the reflective material; and
   applying the reflective material to the front surface by a physical vapor deposition method during which the first state of the reflective material is a vapor phase.

18. The method of claim 14, wherein shaping the substrate further comprises:
   forming the substrate into a first portion of the mirror body;
   forming a second substrate into an insert that defines a second portion of the mirror body, the insert defining the front surface of the mirror body; and
   connecting the second portion of the mirror body to the first portion of the mirror body.

19. The method of claim 18, wherein covering the front surface with the reflective material further comprises positioning the insert in a vacuum chamber and using a physical vapor deposition method to transfer the reflective material to the front surface.

20. The method of claim 14, wherein shaping the substrate further comprises shaping the geometry of the front surface to collimate light scattered from a diffusion screen that is illuminated by the projector of the simulator.

* * * * *